United States Patent [19]

Hirabayashi et al.

[11] Patent Number: 5,745,145
[45] Date of Patent: Apr. 28, 1998

[54] INK JET RECORDING APPARATUS AND METHOD

[75] Inventors: Hiromitsu Hirabayashi; Hiroshi Tajika; Noribumi Koitabashi, all of Yokohama; Miyuki Matsubara, Tokyo, all of Japan

[73] Assignee: Canon Kabushiki Kaisha, Tokyo, Japan

[21] Appl. No.: 758,345

[22] Filed: Dec. 3, 1996

Related U.S. Application Data

[63] Continuation of Ser. No. 567,740, Dec. 5, 1995, abandoned, which is a continuation of Ser. No. 293,927, Aug. 22, 1994, abandoned, which is a continuation of Ser. No. 799,564, Nov. 27, 1991, abandoned.

[30] Foreign Application Priority Data

Nov. 30, 1990 [JP] Japan ................... 2-329747

[51] Int. Cl.[6] .................. G01D 15/16; B41J 2/36
[52] U.S. Cl. .................... 347/183; 347/188
[58] Field of Search ................... 347/183, 184, 347/188; 358/448, 455, 456

[56] References Cited

U.S. PATENT DOCUMENTS

| | | |
|---|---|---|
| 4,087,825 | 5/1978 | Chen et al. . |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,554,593 | 11/1985 | Fox et al. ............... 358/282 |
| 4,558,333 | 12/1985 | Sugitani et al. . |
| 4,578,713 | 3/1986 | Tsao et al. ............... 358/283 |
| 4,617,580 | 10/1986 | Miyakawa . |
| 4,631,548 | 12/1986 | Milbrandt . |
| 4,642,681 | 2/1987 | Ikeda ..................... 358/79 |
| 4,721,968 | 1/1988 | Arai et al. . |
| 4,723,129 | 2/1988 | Endo et al. . |
| 4,740,796 | 4/1988 | Endo et al. . |
| 5,125,072 | 6/1992 | Ng ......................... 395/112 |
| 5,129,048 | 7/1992 | Ng ......................... 395/110 |
| 5,134,666 | 7/1992 | Imao et al. ............... 382/9 |
| 5,134,667 | 7/1992 | Suzuki .................... 382/22 |
| 5,146,554 | 9/1992 | Statt ....................... 395/150 |
| 5,153,925 | 10/1992 | Tanioka et al. ........... 382/52 |
| 5,321,532 | 6/1994 | Ishikawa et al. ......... 358/534 |
| 5,500,662 | 3/1996 | Watanabe . |

FOREIGN PATENT DOCUMENTS

| | | |
|---|---|---|
| 0286414 | 10/1988 | European Pat. Off. . |
| 0300743 | 1/1989 | European Pat. Off. . |
| 54-56847 | 5/1979 | Japan . |
| 59-123670 | 7/1984 | Japan . |
| 59-138461 | 8/1984 | Japan . |
| 59-146262 | 8/1984 | Japan . |
| 60-71260 | 4/1985 | Japan . |

*Primary Examiner*—William J. Royer
*Attorney, Agent, or Firm*—Fitzpatrick, Cella, Harper & Scinto

[57] ABSTRACT

An ink jet recording apparatus and method for forming an image including a text region and a halftone region. The text region contains at least a part of a character and/or a thin line thinner than a predetermined thickness, and the halftone region contains a dot image on a recording medium. An image is formed by ejecting ink from recording heads in response to an input signal. The apparatus or method identifies the text region and the halftone region of an image on the basis of the input signal, expels black ink onto a recording area on the recording medium so as to form at least a part of the text region in a first scanning of the recording heads, expels a plurality of inks including the black ink onto the recording area so as to form at least a part of the text and the halftone regions in a second scanning, and repeating the first scanning and the second scanning on the next recording area after incrementing the recording medium.

105 Claims, 23 Drawing Sheets

FEATHERING EVALUATION

| INK DEPOSITION DENSITY (nl/mm²) | 10.0 | 12.5 | 15.0 | 17.5 | 20.0 | 22.5 | 25.0 | 27.5 | 30.0 |
|---|---|---|---|---|---|---|---|---|---|
| NON-COATED PAPER A | ○ | ○ | ○ | ○ | △ | × | × | × | × |
| NON-COATED PAPER B | ○ | ○ | ○ | ○ | ○ | × | × | × | × |
| NON-COATED PAPER C | ○ | ○ | ○ | ○ | △ | △ | × | × | × |
| COATED PAPER D | ○ | ○ | ○ | ○ | ○ | ○ | ○ | △ | △ |

FIG. 11

(EMBODIMENT 3)
TEXT REGION: DOUBLE DEPOSITS
HALFTONE REGION: STAGGERED AND
COUNTER-STAGGERED PATTERNS (COMPARATIVE EXAMPLE 1)
SINGLE DEPOSITION (COMPARATIVE EXAMPLE 2)
DOUBLE DEPOSITION

INK JET RECORDING APPARATUS AND METHOD

This application is a continuation of application Ser. No. 08/567,740, filed Dec. 5, 1995, now abandoned, which is a continuation of application Ser. No. 08/293,927 filed Aug. 22, 1994, now abandoned, which is a continuation of application Ser. No. 07/799,564 filed Nov. 27, 1991, now abandoned.

BACKGROUND OF THE INVENTION

1. Field of the Invention

The present invention relates to an ink jet recording apparatus and method that can perform recording onto a diversity of recording media.

2. Description of the Prior Art

Several types of ink jet recording apparatuses are known that can perform recording on a plurality of kinds of recording media by changing recording modes in accordance with a recording medium. For example, in the case where transparent paper for an over-head projector is used, superimposing recording is performed onto the same image area so that ink amount deposited in one time can be controlled in accordance with the ink absorption power of a recording medium. Thus, recording onto noncoated plain paper, such as transparent paper, on which no special ink absorption layer is formed, can be performed without deterioration of images like running or insufficient intensity level of ink caused by lack of ink absorption power or ink spreading.

Conventional techniques, however, have a problem that recording speed is greatly reduced for the following reasons: First, in the conventional techniques, to achieve compatibility between avoiding ink running and increasing image density, it is necessary not only to reduce ink drop volume deposited at one time onto the same and its neighboring pixels, but also to lengthen intervals at which the ink drops are deposited. In addition, in superimposing recording, larger volumes of ink are separately deposited onto the same area several times. Consequently, it takes a long time to perform recording to the same recording area.

Above-described techniques that modify recording dots in accordance with a type of recording medium are disclosed in U.S. Pat. Nos. 4,617,580 and 4,721,968. The former identifies whether a recording medium is a light transmitting material or a normal paper sheet, and controls density of the image recorded. Although this control is effective in a certain range, degradation in an image occurs in a special case. On the other hand, the latter discloses a technique to use a plurality of ink droplets for forming one dot so as to enhance the image density on a light transmitting material. Although the image density is sufficiently enhanced with this technique, degradation in an image sometimes occurs.

SUMMARY OF THE INVENTION

Accordingly, it is an object of the present invention to provide an ink jet apparatus and method, which eliminates the above-described problems associated with the conventional techniques to perform recording in accordance with kinds of images to be recorded and types of recording media in order to achieve recording that is practically sufficient.

In the first aspect of the present invention, an ink jet recording apparatus for performing recording on a recording medium by depositing ink onto the recording medium in response to a recording data signal comprises:

a plurality of recording heads for ejecting inks;

moving means for relatively moving the recording heads and the recording medium;

recording medium identifying means for identifying a type of the recording medium;

image identifying means for identifying a recording data signal corresponding to a text region which includes at least a part of a character and/or a line thinner than a predetermined thickness, and for identifying a recording data signal corresponding to a halftone region including a dot image;

recording data signal processing means for processing the recording data signal based on identification result by the image identifying means; and recording controlling means for controlling ink ejection of the recording head and movement by the moving means in accordance with the identification result by the image identifying means and on the basis of the recording data signal processed by the recording data signal processing means.

Here, the image identifying means may comprise:

black signal generating means for generating a first black signal by suppressing chromatic components of the recording data signal;

black signal binarizing means, connected to an output of the black signal generating means, for binarizing the first black signal outputted from the black signal generating means; and black image identifying means, connected to an output of the black signal generating means, for identifying the text regions, or the halftone regions on the basis of the binary first black signal.

The black signal generating means may comprise:

a maximum value detector for detecting a maximum value of R, G and B components of the recording data signal;

a minimum value detector for detecting a minimum value of the R, G and B components of the recording data signal;

a subtracter for subtracting the minimum value from the maximum value;

a multiplier for multiplying an output of the subtracter by a predetermined fixed value;

an adder for adding the maximum value and an output of the multiplier; and a limiter for limiting an output of the adder.

The black signal binarizing means may comprise:

means for producing first black signals of a pixel of interest and its neighboring pixels;

averaging means for calculating an average value of the first black signals of the pixel of interest and its neighboring pixels;

first comparing means for comparing the average value with the black signal of the pixel of interest to produce a second black signal of the pixel of interest representing that the pixel of interest is black; and second comparing means for comparing a difference of the average value and the first black signal of the pixel of interest with a predetermined value to produce a differential signal representative of difference between a black level of the pixel of interest and an average value of black levels of its neighboring pixels.

The black image identifying means may comprise:

means for producing second black signals of a pixel of interest and of its neighboring pixels by delaying the second black signal outputted from the first comparing means;

means for producing an isolation indicating signal of the pixel of interest by comparing the second black signal of the pixel of interest with the second black signals of its neighboring pixels;

means for producing a third black signal representing that the pixel of interest is black when the isolation indicating signal, the second black signal and the differential signal of the pixel of interest are all indicating black level, and means for producing fourth black signal representing that the pixel of interest is a part of text region based on the third black signals of the pixel of interest and of its neighboring pixels.

The recording data signal processing means may suppress the color components of the recording data signal when the fourth black signal indicates that the pixel of interest is in a text region.

The recording controlling means may control the recording heads so that each color component of the recording data signal is directly recorded.

The recording controlling means may control, when the recording medium identifying means identifies that the recording medium is of low ink absorption, the recording heads so that each color component of the recording data signal corresponding to the halftone region is recorded once, while black component of the recording data signal corresponding to the text regions is recorded twice.

The recording heads may include four heads, each of which corresponds to each one of four colors of black, cyan, magenta and yellow, and is divided into a plurality of sections each including a plurality of orifices aligned along a subscanning direction, and the recording controlling means controls the recording heads so that selected sections sequentially eject ink.

Each of the recording heads generates film boiling which grows bubbles for expelling ink by using thermal energy.

The recording heads may include two or more recording heads for ejecting black ink.

In the second aspect of the present invention, an ink jet recording method for forming on a recording medium an image including a text region that contains at least a part of a character and/or a thin line thinner than a predetermined thickness, and a halftone region that contains a dot image by ejecting ink from recording heads in response to an input signal comprises the steps of:

identifying the text region and the halftone region of said image on the basis of said input signal;

expelling black ink onto a recording area on the recording medium so as to form at least a part of the text region in a first scanning of the recording heads;

expelling a plurality of inks including the black ink onto the recording area so as to form at least a part of the text and the halftone regions in a second scanning of the recording heads; and repeating the first scanning and the second scanning on the next recording area after incrementing the recording medium.

Here, each of the recording heads may be divided into a plurality of sections, and the steps for expelling black ink and a plurality of inks are sequentially performed from bottom sections to top sections by incrementing the recording medium by a length of the sections.

The text region may be recorded by depositing black ink twice on the same recording area, and the halftone region is recorded by separately depositing color inks in a staggered pattern and in a counter-staggered pattern, to which the halftone region is divided.

The step of expelling black ink may be executed by two recording heads ejecting black ink in response to the input signal.

The text region may be recorded by using black ink and cyan ink.

The ink jet recording method may further comprise the step of identifying a type of the recording medium.

Each color component of the recording data signal corresponding to the halftone region may be recorded once, while black component of the recording data signal corresponding to the text region is recorded twice, when the recording medium is of low ink absorption power.

According to the present invention, recording data are identified based on a recording data signal whether they belong to a text region or a halftone region. In response to the identification result, the recording data signal corresponding to a text region undergoes processing such as being recorded by using only black ink, or omitting certain neighboring pixels.

Furthermore, types of recording media are identified so that recording is controlled in accordance with a type. For example, when overhead projector paper having a poor ink absorption power is used as a recording medium, recording control such as depositing ink onto the same text region is carried out a plurality of times.

In addition, ink ejection process in response to a recording data signal is modified in accordance with a type of recording medium. For example, when an OHP paper (a light transmitting or a light reflective recording material) having a poor ink absorption characteristic is used, each dot of a predetermined category is formed by a plurality of ink droplets by a plurality of scanning (or by reciprocating scanning) by using the same data.

The present invention can achieve improvement in an image that cannot have been appropriately accomplished before. It provides an ink jet recording apparatus and method that can appropriately record images by modifying ink recording process such as ejection timing, the number of ink droplets to be recorded, the type of inks used or the like in accordance with the type of recording signals and that of recording media.

The above and other objects, effects, features and advantages of the present invention will become more apparent from the following description of the embodiments thereof taken in conjunction with the accompanying drawings.

BRIEF DESCRIPTION OF THE DRAWINGS

FIG. 11 is a table showing feathering evaluations with regard to coated and noncoated papers;

DETAILED DESCRIPTION OF PREFERRED EMBODIMENTS

The invention will now be described with reference to the accompanying drawings.

Embodiment 1

Figure 1A:
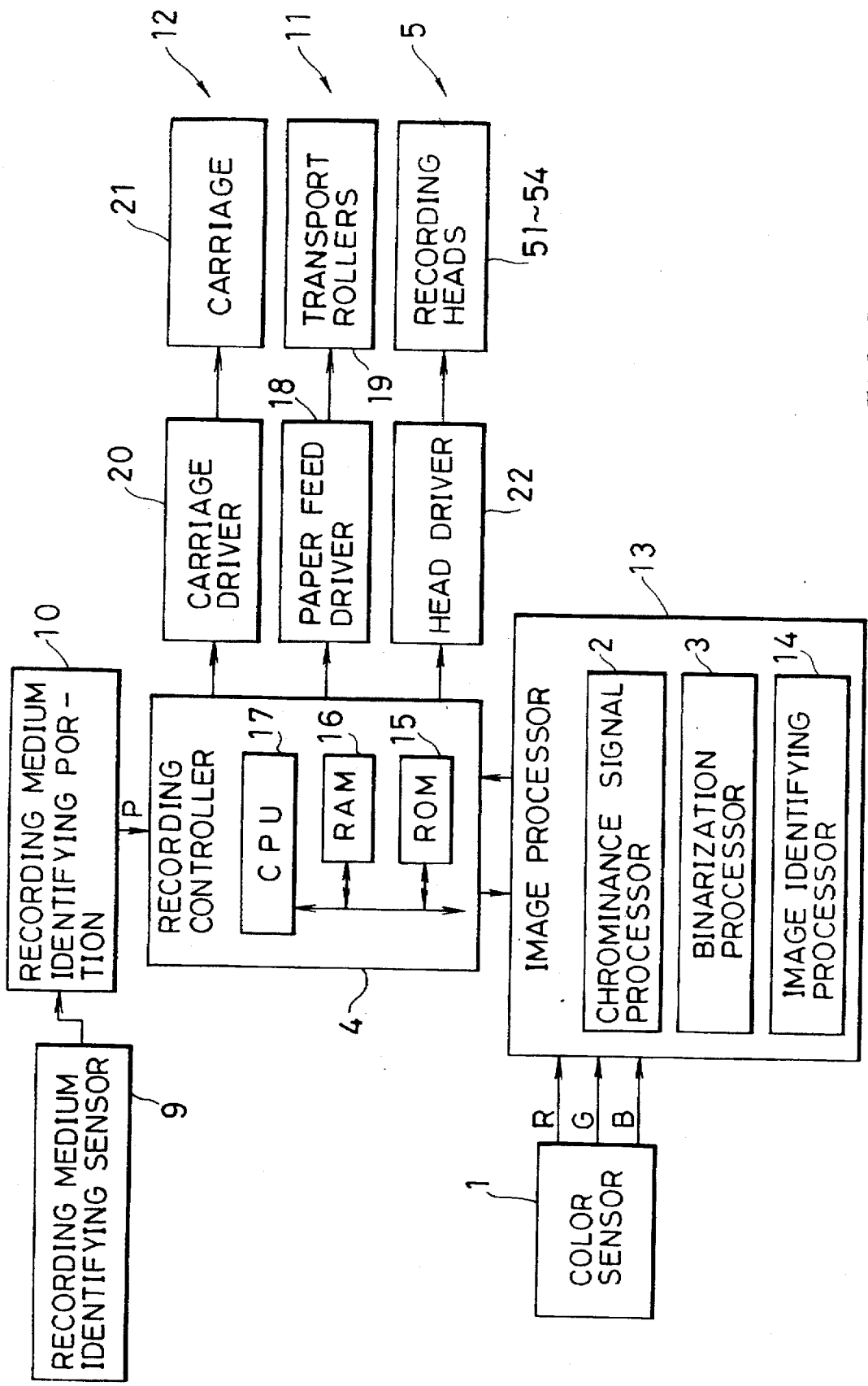
FIGS. 1A and 1B are block diagrams showing an arrangement of a first embodiment of an ink jet recording apparatus according to the present invention.
Figure 1B:
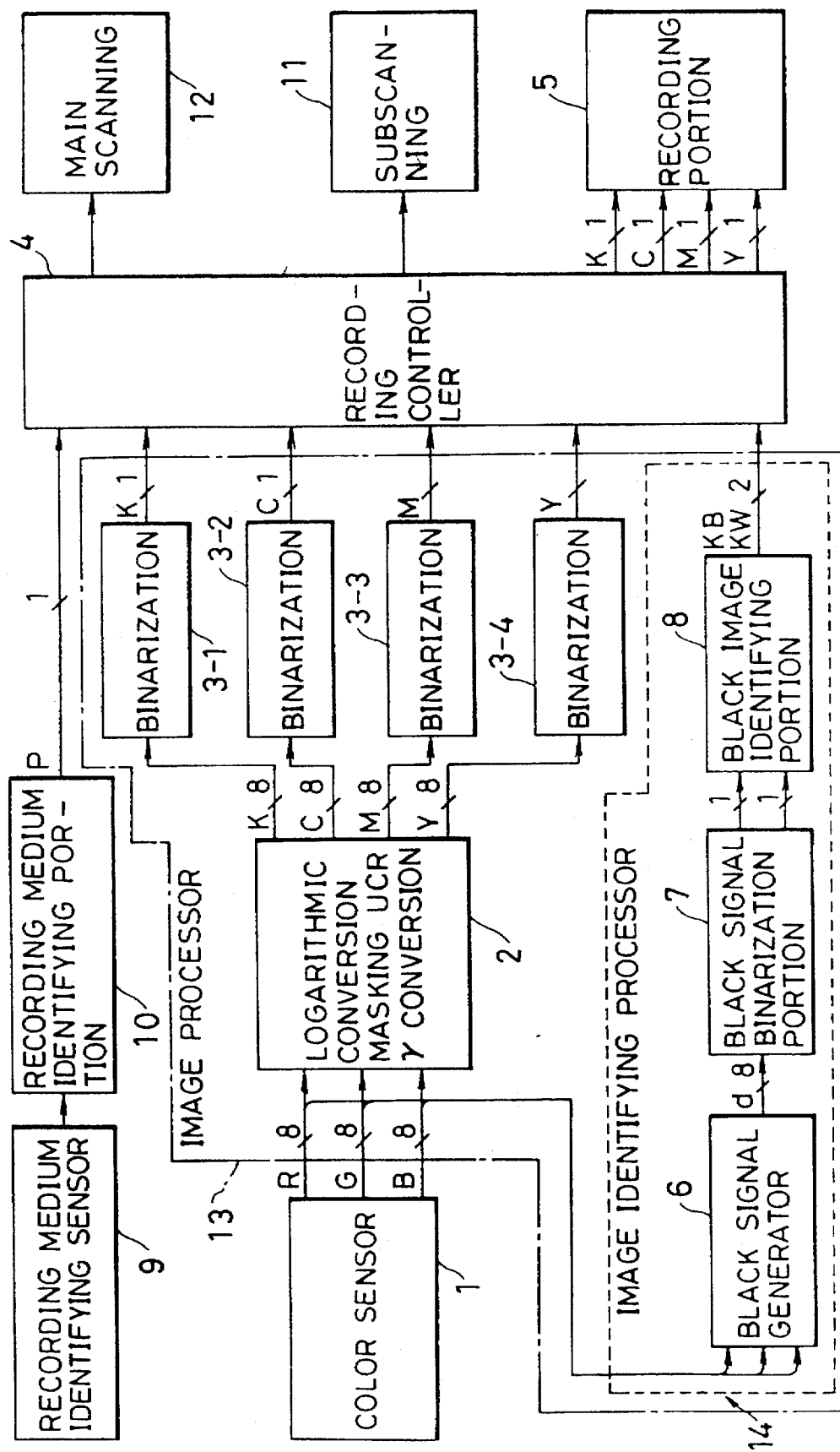

FIG. 1A is a block diagram showing a major portion of a color copying machine employing an ink jet recording apparatus associated with a first embodiment of the present invention. FIG. 1B is a block diagram showing details of some elements shown in FIG. 1A.

In these figures, a color sensor 1 picks up an image on a document by separating each points of the image into three colors R, G and B, and by quantizing each color into an 8-bit signal. These R, G and B signals constitute an image recording signal which is inputted into an image processor 13. The image recording signal undergoes chrominance signal processing such as a logarithmic conversion, masking, UCR (Under Color Removal) and gamma correction in a chrominance signal processor 2 in the image processor 13. Thus, four recording signals, each having 8-bits and corresponding to each one of K (Black), C (Cyan), M (Magenta) and Y (Yellow), are obtained. The K, C, M and Y recording signals are subjected to a so-called pseudo halftone processing to be quantized into binary signals by binarization portions 3-1, 3-2, 3-3 and 3-4, respectively, which are included in a binarization processor 3.

On the other hand, the R, G and B recording signals inputted into the image processor 13 are supplied to an image identifying processor 14 which identifies a text region that includes at least a part of a character or a line thinner than a predetermined thickness. First, a black signal generator 6 produces an 8-bit (256-level) black signal d by suppressing color components of the R, G and B signals. Then, the black signal d is quantized into a binary signal by a black signal binarization portion 7, and is supplied to a black image identifying portion 8. The black image identifying portion 8 identifies continuous halftone regions, i.e., dot image regions, and text regions, and outputs 1-bit image identifying signals KB and KW in accordance with respective regions. The signals KB and KW are inputted into a recording controller 4.

A recording medium identifying sensor 9 detects a recording medium. For example, coated paper as a normal recording medium and noncoated paper like transparent paper for an overhead projector as a special recording medium are detected through an amount of light reflected by or transmitted through a recording medium. Here, noncoated paper requires a special recording process because of low absorption power of ink. The detection signal produced by the recording medium identifying sensor 9 is fed to a recording medium identifying portion 10. The recording medium identifying portion 10 creates a 1-bit recording medium identification signal P from the detection signal, and transmits the signal P to the recording controller 4.

In the first embodiment of the present invention, the recording controller 4 controls the binary recording data signal created in accordance with the image identification signal and the recording medium identification signal, and controls driving of transportation of the recording medium and scanning of the recording head, so that optimal recording control is achieved depending on the type of an image and on the type of a recording medium.

The recording control of the first embodiment will be described below.

Here, a black text region includes at least a part of a character and/or a line thinner than an useful line image. In addition, although the present embodiment identifies a text region, a technique that identifies a character and a thin line independently is incorporated into the present invention.

Color recording is generally carried out by additive color mixtures using color separated image recording signals. In this case, black text regions are generally reproduced by adding three colors C, M and Y or four colors K, C, M and Y. This embodiment uses four colors K, C, M and Y. Recording text regions by simply adding four color inks, however, poses the following problems:

(1) Complete black does not appear by simply adding the color inks.

(2) Color fringes occur because of difficulty of high precision superposition.

(3) Excessive UCR (Under Color Removal) for enhancing black text regions deteriorates the chroma of continuous halftone regions, i.e., of dot image regions.

(4) The problems (1)–(3) are particularly noticeable when a recording medium is low chromogenic, or has low ink spreading characteristic.

To solve these problems, the present embodiment, by using the image identifying processor 14, discriminates black text regions from continuous halftone regions (dot image regions) in an image to be recorded, and records the black text regions by using only black ink K. This makes it possible to reproduce an image whose black text regions have sufficient density (intensity) and resolution, and whose halftone regions are clear having high chroma and good gradation, when coated paper is used having an ink accepting layer formed on its surface to improve ink absorption and chromogenic characteristics. However, when a special recording medium such as transparent paper having characteristics as mentioned in (4) above is used, recording black text regions with only black ink is not enough to reproduce high quality images. Accordingly, it is necessary to change recording control in such cases.

Considering these, a normal recording operation for coated paper is explained first, and subsequently, a special recording operation for noncoated paper will be described.

First, the normal recording operation in which coated paper is used as a recording medium will be described in the order of processing by the image identifying processor 14, control of binary recording signals by the recording controller 4, and recording method. Incidentally, the chrominance signal processor 2 and the binarization processor 3 can be implemented by employing known techniques without imposing undue limit to the present invention, and so the description thereof will be omitted.

IMAGE IDENTIFYING PROCESSOR

Figure 2A:
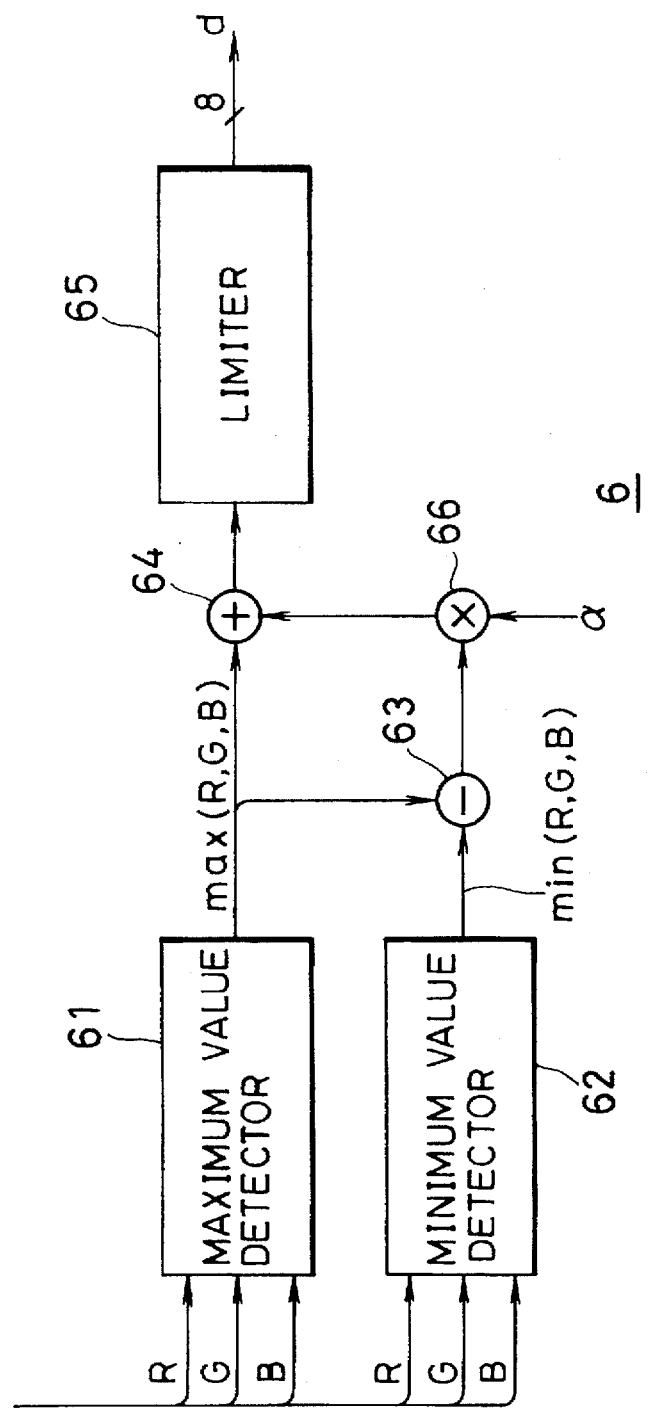
FIG. 2A is a block diagram showing a black signal generator of an image identifying processor shown in FIGS. 1A and 1B.

FIG. 2A is a block diagram showing a detailed arrangement of the black signal generator 6. A maximum value detector 61 and a minimum value detector 62 compare, pixel by pixel, levels of 8-bit R, G and B signals inputted thereto, and produce a maximum value max(RGB) and a minimum value min(RGB), respectively. An adder 63 calculates the difference between the maximum value and the minimum value {max(RGB)−min(RGB)} of the R, G and B signal for each pixel. A multiplier 66 multiplies the difference by a fixed value $\alpha$, and an adder 64 adds the result to max(RGB). When the added result exceeds 8-bit range, it is limited to 255 by a limiter 65. Thus, an 8-bit black signal d is obtained for each pixel.

Figure 2B:
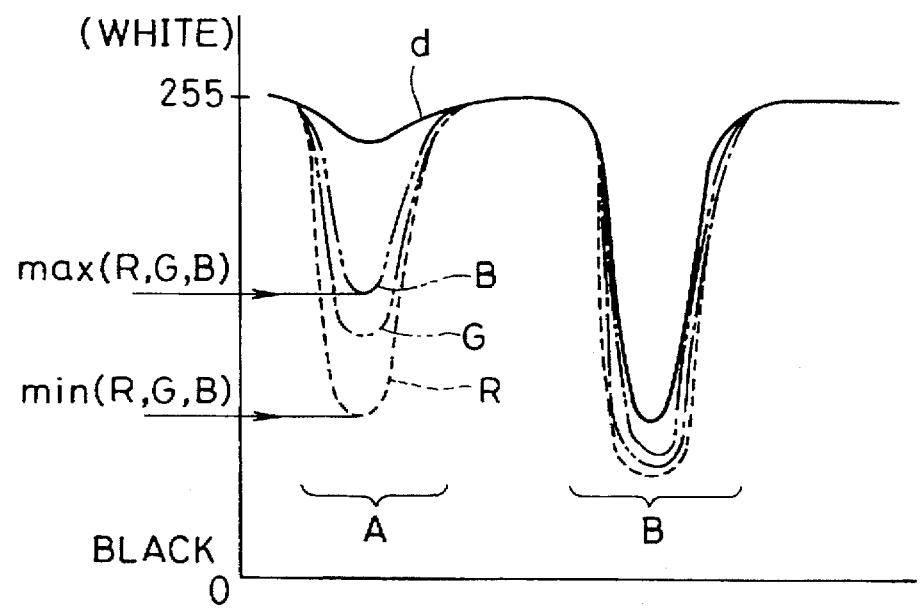
FIG. 2B is a diagram illustrating an operation of a black signal generator of FIG. 2A.

FIG. 2B is a diagram for explaining the process for obtaining the black signal d. In this embodiment, it is assumed that the value of white increases consistently with the values of the chrominance signals R, G and B, and that the black level corresponds to R=G=B=0. Thus, it is supposed that a section A of FIG. 2B indicates a colored thin line, and a section B represents a black line.

The above processing by the black signal generator 6 is expressed by the following equation.

$$d = \max(RGB) + \alpha \{\max(RGB) - \min(RGB)\} \quad (1)$$

The physical meaning of equation (1) is as follows: It is rightly thought that the value {max(RGB)−min(RGB)} represents color and the value max(RGB) indicates a gray level or brightness. When the value {max(RGB)−min(RGB)} is large, that is, color is present, the color is converted so as to shift toward white by equation (1) because the value is multiplied by $\alpha$ and is added to the value max(RGB). Accordingly, the greater the fixed value $\alpha$ is, the whiter a color pixel becomes. For this reason, the fixed value $\alpha$ is called a color suppression constant that represents a degree of suppressing of color of a pixel. In FIG. 2B, $\alpha$ is set as $\alpha = 1$, and when the values max(RGB) and {max(RGB)−min(RGB)} are large, the value d of equation (1) exceeds the maximum value 255 representing a complete white pixel, and hence, is limited to 255 by the limiter 65 shown in FIG. 2A. Thus, it is rightly supposed that changes in the signal d created in accordance with equation (1) correspond to changes in the black component.

Figure 3A:
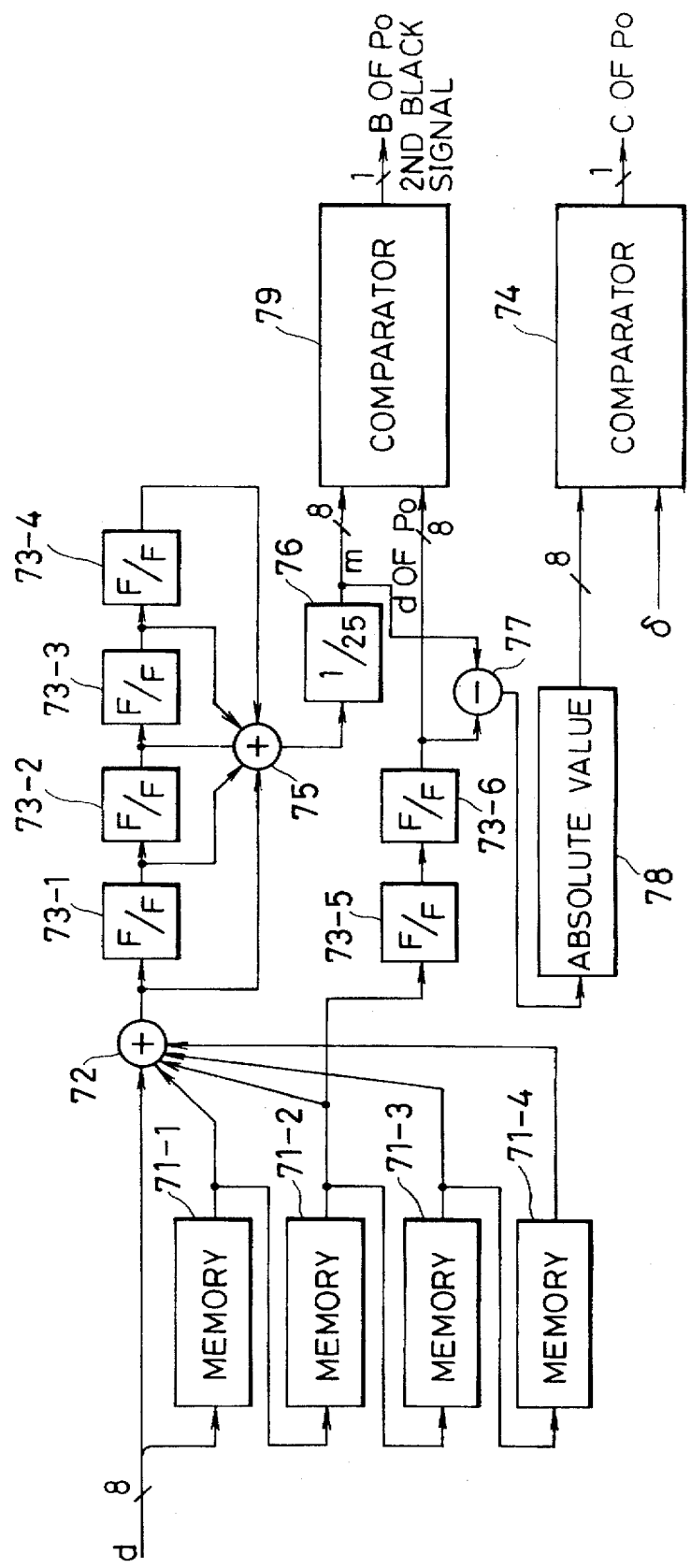
FIG. 3A is a block diagram showing a detailed arrangement of a black signal binarization portion of the image identifying processor.
Figure 3B:
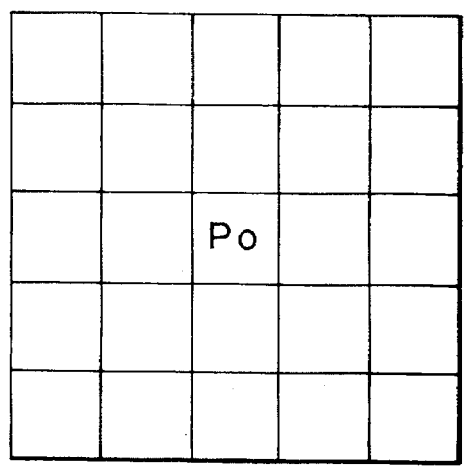
FIG. 3B is a diagram showing a pixel of interest P0 and its neighboring pixels to be processed simultaneously by the black signal binarization portion.

The 8-bit black signal d is inputted to the binarization portion 7 whose detailed arrangement is shown in FIG. 3A. In FIG. 3A, the black signal d is passed through 4 cascaded memories, and is sequentially delayed. Each memory delays the black signal d by one line. The four memories 73-1–73-4 produce four black signals associated with four pixels which are vertically aligned. The four black signals and the current black signal associated with a current pixel are summed up by an adder 72. Further, the sum total outputted from the adder 72 is successively delayed by the amount corresponding to one pixel by four cascaded flip-flop circuits 73-1–73-4, and the outputs of the flip-flop circuits 73 and the adder 72 are further added by an adder 75. The output of the adder 75 is a total sum of 25 pixels including a pixel of interest P0 and its 24 neighboring pixels as shown in FIG. 3B. In this case, the black signal of the pixel of interest P0 passes the memories 71-1 and 71-2, and flip-flops circuits 73-5 and 73-6, and is outputted from the flip-flop circuit 73-6. Accordingly, the black signal associated with the pixel of interest P0 is delayed by the amount corresponding to 2 lines and 2 pixels than the current black signal. Thus, an average m of the black signals associated with the pixel of interest P0 and its 24 neighboring pixels can be obtained by dividing the output of the adder 75 by 25 with a divider 76.

A comparator 79 compares the black signal d of the pixel of interest P0 with the average m which is outputted from the flip-flop circuit 73-6 and is used as a threshold, and outputs a binary signal (a second black signal) B which represents the following:

B=1 (black) when d<m

B=0 (white) when d≧m  (2)

In addition, the difference between the average m and the black signal d of the pixel of interest P0 is obtained by an adder 77, and is transformed into its absolute value by an absolute-value circuit 78. The absolute value of the difference is compared with a fixed value $\delta$ by a comparator 74 to obtain a binary signal (a differential signal) C that indicates the following:

C=1 when |d−m|>$\delta$

C=0 when |d−m|≦$\delta$  (3)

Here, the second black signal B is a more sophisticated signal than the black signal d, which is obtained by converting the black signal d into a binary signal considering the neighboring pixels, and the differential signal C is a binary signal representing a rate of change in intensity levels at each pixel. Thus, a condition that B=1 and C=1 indicates that the rate of change in intensity level at a pixel is greater than the fixed value $\delta$, and that the direction of change is toward black. In other words, a pixel whose B=C=1 is highly probable to belong to a text region.

It cannot be denied, however, that the pixel may belong to a halftone region represented by dots, and hence, the two binary signals B and C are transferred to the black image identifying portion 8 so as to identify the region the pixel belongs to.

Figure 4A:
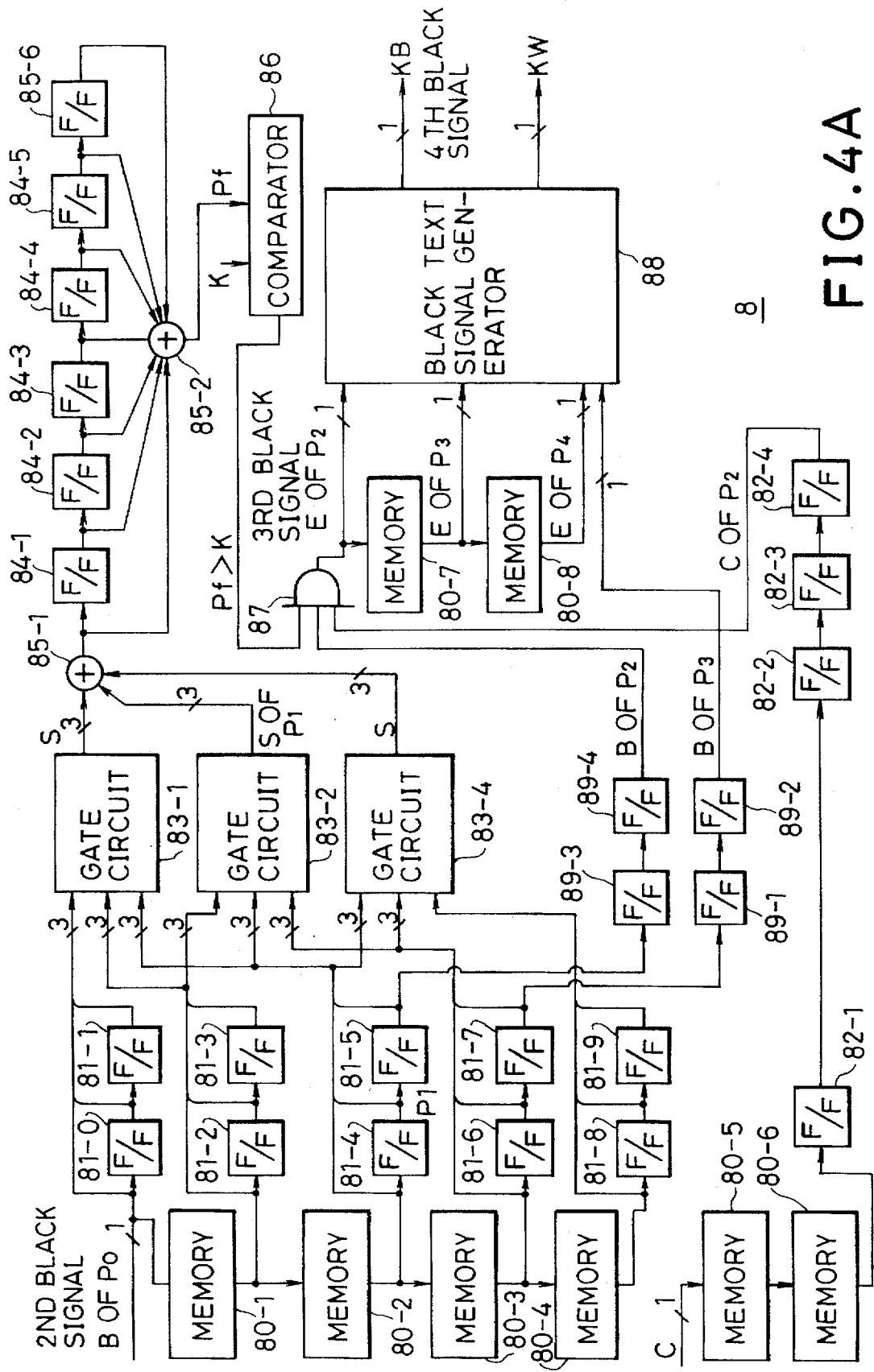
FIG. 4A is a block diagram showing a detailed arrangement of a black image identifying portion in the image identifying processor.
Figure 4B:
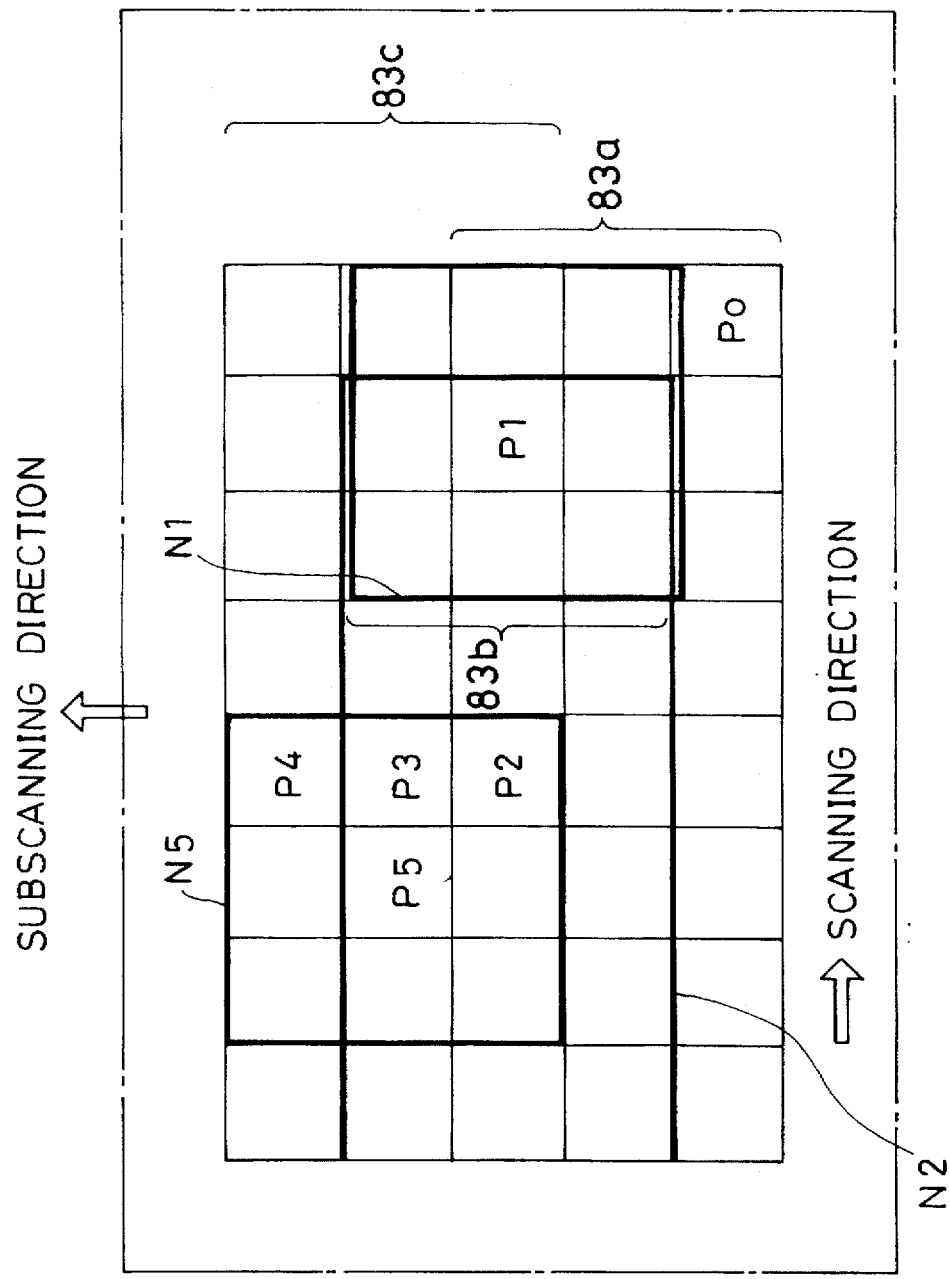
FIG. 4B is a diagram showing pixels of interest P1–P5 and their neighboring pixels to be processed by the black image identifying portion and the black signal generator.

FIG. 4A is a block diagram showing a detailed arrangement of the black image identifying portion 8. In FIG. 4A, the second black signal B inputted as a binary signal is delayed by four line memories 80-1, 80-2, 80-3 and 80-4 which are connected in cascade, and each of which delays the signal by an amount corresponding to one line. The current input signal B and the output signals of the line memories 80-1–80-4 are further delayed by an amount corresponding to one pixel by flip-flops 81-0, 81-2, 81-4, 81-6 and 81-8, respectively, and the outputs of these flip-flops are further delayed by the amount of one pixel by flip-flops 81-1, 81-3, 81-5, 81-7 and 81-9, respectively. Accordingly, when the output of the flip-flop 84-1 is set as a pixel of interest P1 as shown in FIG. 4B, the signals B of eight neighboring pixels of the pixel of interest P1 correspond to the inputs to the flip-flops 81-2, 81-4 and 81-6 and the outputs from the flip-flops 81-2, 81-6, 81-3, 81-5 and 81-7. The signals B of the 9 neighbors including the pixel of interest P1 are inputted to a gate circuit 83-2. Likewise, the signal B of a pixel corresponding to the output of the flip-flop 81-2, i.e., of a pixel delayed by one line than the pixel of interest P1, and the signals B of 8-neighbors of that pixel are inputted to a gate circuit 83-1. In addition, the signal B of a pixel corresponding to the output of the flip-flop 82-6, i.e., of a pixel advanced by one line than the pixel of interest P1, and the signals B of 8-neighbors of that pixel are inputted to a gate circuit 83-4.

The gate circuits 83-1, 83-2 and 83-4 assign values S to the pixel delayed by one line than the pixel of interest P1, to the pixel of interest P1, and to the pixel advanced by one line than the pixel of interest P1, respectively. The value S takes one of the values 0–4 to represent the degree of isolation of the pixel of interest P1 or the like from its 8 neighbors, that is, the possibility of having a binary value (0 or 1) reversal of those of the 8 neighbors. The possibility that the pixel of interest P1 is an isolated dot increases consistently with the value of S. Accordingly, value 0 indicates a high possibility that the pixel of interest P1 belongs to a text region because such a region is a group of one dimensional continuous dots. Correct judgement whether a pixel belongs to a text region or not, however, cannot be made on the basis of only one pixel, and hence, isolation indicators S assigned to each pixel are summed two-dimensionally so as to judge without error.

First, an adder 85-1 adds three isolation indicators S corresponding to vertically aligned three pixels. The output of the adder 85-1 is delayed by six flip-flops 84-1–84-6 arranged in a cascade so that six isolation indicators S are held in these flip-flops. The outputs of the six flip-flops are added to the output of the adder 85-1 by an adder 85-2 to produce a total sum Pf. Here, let us assume that a pixel of interest is set as a pixel P2 of FIG. 4B which is outputted from a flip-flop 89-4, that is, the pixel which has 2 line and 4 pixel delay with regard to the second black signal B of the pixel P0 currently inputted to the flip-flop 81-0. In this condition, the total sum Pf is a total of 3×7 pixels N2 including the pixel of interest P2 and its neighbors. This distinctive value Pf indicates a two-dimensional spatial frequency: a greater Pf value indicates that more frequent reversal between "0" and "1" of the binary signals B occur among the neighboring pixels, thus indicating the existence of more two-dimensionally isolated pixels.

On the basis of the second black signal B, the differential signal C and the distinctive value Pf, the following result can be obtained:

E=1 when Pf>K and C=1 and B=1

E=0 remaining cases     (3)

where E is a third black signal representing a possibility that a pixel belongs to a text region, and K is a fixed value whose value is about 4 to 5. The judgement of equation (3) is carried out as follows: First, the Pf value of the pixel of interest P2 is compared with the fixed value K by a comparator 86. Second, the differential signal C of the pixel of interest P2 is obtained by delaying the binary signal C by 2 lines and 4 pixels by using memories 80-5 and 80-6 and flip-flops 82-1–82-4. The signals B and C of the pixel of interest P2 are supplied to an AND gate 87 together with the distinctive value Pf of the pixel P2. The output of the AND gate 87 is a third black signal E of the pixel P2, which indicates that the pixel P2 belongs to a text region.

The third black signal E is further delayed by two 1-line delay memories 80-7 and 80-8 connected in a cascade, and three third black signals E of vertically aligned three pixels P2, P3 and P4 in FIG. 4B are inputted to a black text signal generator 88. In addition, the second black signal B of the pixel P3 is fed to the black text signal generator 88, which creates the final signals KB and KW.

Figure 5:
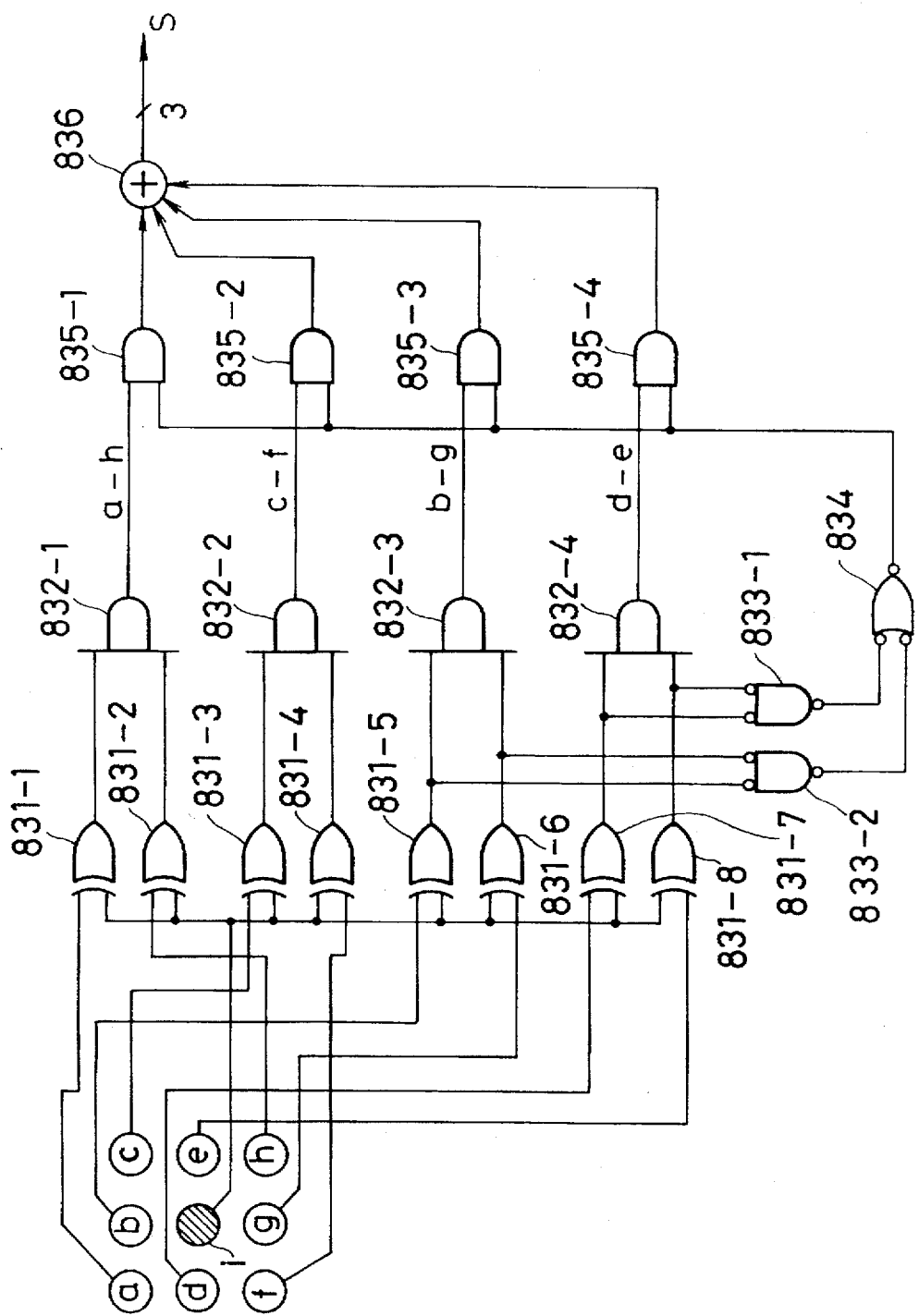
FIG. 5 is a circuit diagram showing a detailed arrangement of a gate circuit in the black image identifying portion.

Next, an arrangement of the gate circuit 83 will be described. FIG. 5 is a circuit diagram illustrating a detailed arrangement of the gate circuit 83. Neighboring pixels a, b, c, d, e, f, g and h of the central pixel i correspond to input and output signals B of the flip-flops 81-0 - 81-9. EXCLUSIVE-OR gates 831-1 and 831-2 detect whether the pixel of interest i and its neighbors a and h reverse in the diagonal direction a, i and h. When the outputs of both EXCLUSIVE-OR gates 831-1 and 831-2 are "1", the output of an AND gate 832-1 becomes "1", which indicates that the pixel of interest i is isolated from its neighbors in the diagonal direction a,i,h. Likewise, EXCLUSIVE-OR gates 831-3 and 831-4 and an AND gate 832-2 detect isolation of the pixel i in the diagonal direction c,i,j, EXCLUSIVE-OR gates 831-5 and 831-6 and an AND gate 832-3 detect isolation of the pixel i in the vertical direction b,i,g, and EXCLUSIVE-OR gates 831-7 and 831-8 and an AND gate 832-4 detect isolation of the pixel i in the horizontal direction d,i,e. In addition, AND gates 833-1 and 833-2 and OR gate 834 detect whether the pixel of interest i and its neighbors are consecutively "0" or "1" in the vertical direction b,i,g or in the horizontal direction d,i,e. When three pixels in these directions are consecutively "0" or "1", the output of the OR gate 834 becomes "0". The output of the OR gate 834 is ANDed with the outputs from the AND gate 832-1–832-4 by AND gates 835-1–835-4, respectively. The outputs of the AND gates 835-1–835-4 are added by an adder 836, thereby obtaining the S value indicating the degree of isolation of the pixel i as one of the numbers 0–4. The degree of isolation increases consistently with the value of S.

The signal outputted from the OR gate 834 indicates continuity of pixel levels. For example, when the signal level is consecutive, it suggests a line extending vertically or horizontally on the sheet of a document or a recording medium. This indicates that the pixel of interest belongs to a text region with high probability. Therefore, the S value is uniformly made "0" (S=0) in this case, which results in lowering the distinctive value Pf. Incidentally, it may be preferable that a summing area of the Pf value be broader than that of the present embodiment which uses the 3×7 rectangular area N2 because this enables more precise identification of a text region.

Next, an arrangement of the black text signal generator 88 is described with reference to FIG. 6. This circuit produces two 1-bit signals KW and KB. The signal (a fourth black signal) KB indicates that a pixel of interest belongs to a black text region when it is "1". On the other hand, the signal KW indicates, when it is "1", that the second black signal B of a pixel of interest is "0", and that the third black signal E of at least one of the neighboring pixels of the pixel of interest is "1". This indicates that a text region exists adjacent to the pixel of interest.

Figure 6:
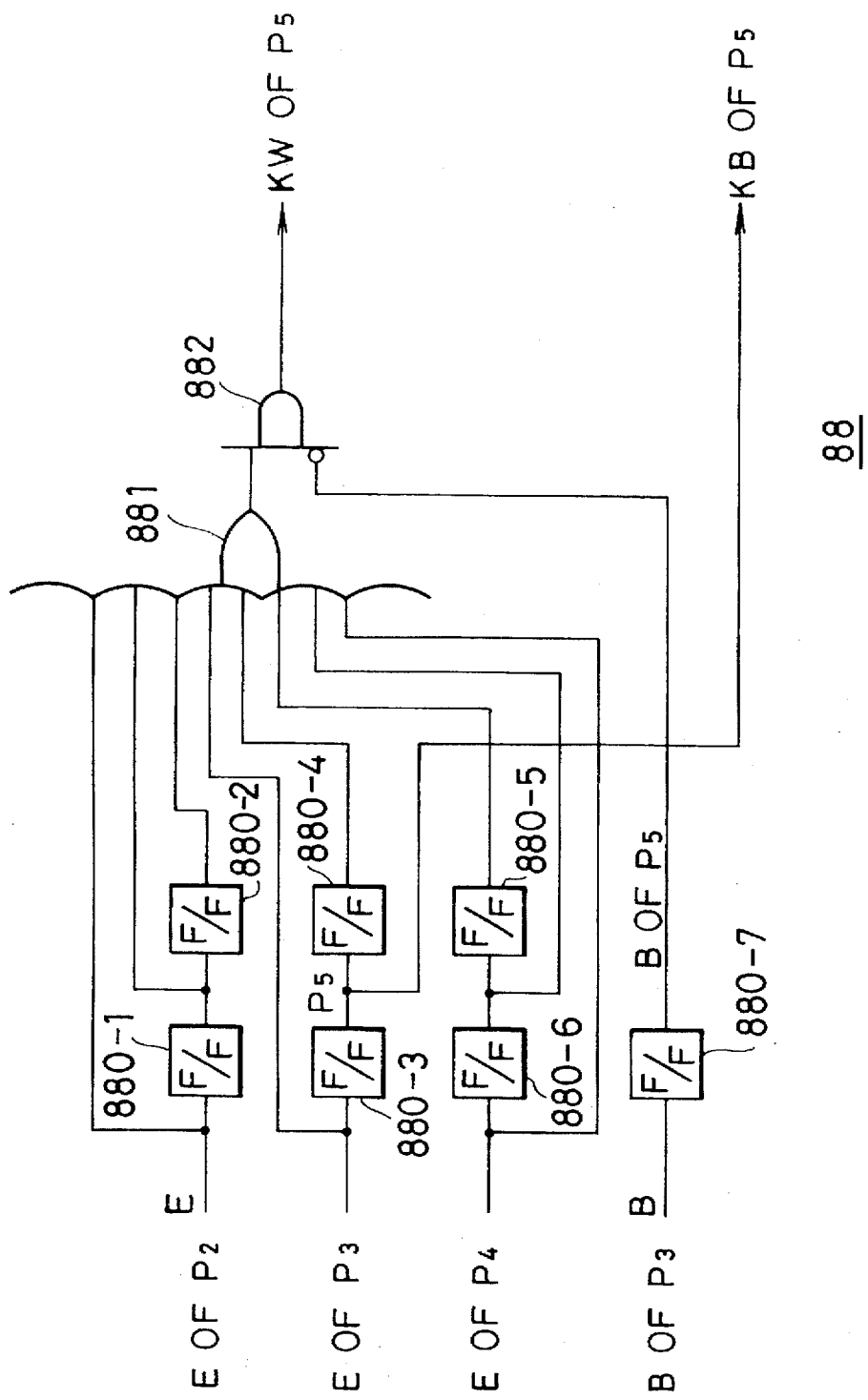
FIG. 6 is a circuit diagram showing a detailed arrangement of a black text signal generator.

In FIG. 6, three 1-bit third black signal E and the second black signal B (shown in FIG. 4A) are inputted to flip-flops 880-1, 880-3, 880-6 and 880-7, respectively. The outputs of the flip-flops 880-1, 880-3 and 880-6 are further delayed by flip-flops 880-2, 880-4 and 880-5. In this case, the output of the flip-flop 880-3 is set as a pixel of interest P5 shown in FIG. 4B. Then, the output of an OR gate 881 becomes "1" when at least one of the E signals of 8 neighboring pixels of the pixel of interest P5 is "1". On the other hand, the second black signal B of the pixel of interest P5 is produced from the flip-flop 880-7, and its inverted signal is inputted to an AND gate 882 together with the output of the OR gate 881. Thus, the signal KW of the pixel of interest P5 is obtained.

Next, processing of the recording controller 4 which controls a recording signal on the basis of the signals KB and KW will be described.

STANDARD RECORDING CONTROL

The inner processing for generating the signals KB and KW delays the second black signal B by 3 lines and 5 pixels from the pixel P0 to P5 as shown in FIG. 4B . For this reason, the recording signals outputted from the binarization processor 3 shown in FIG. 1B are delayed by that amount so as to synchronize the recording signal with the signals KB and KW.

Figure 7:
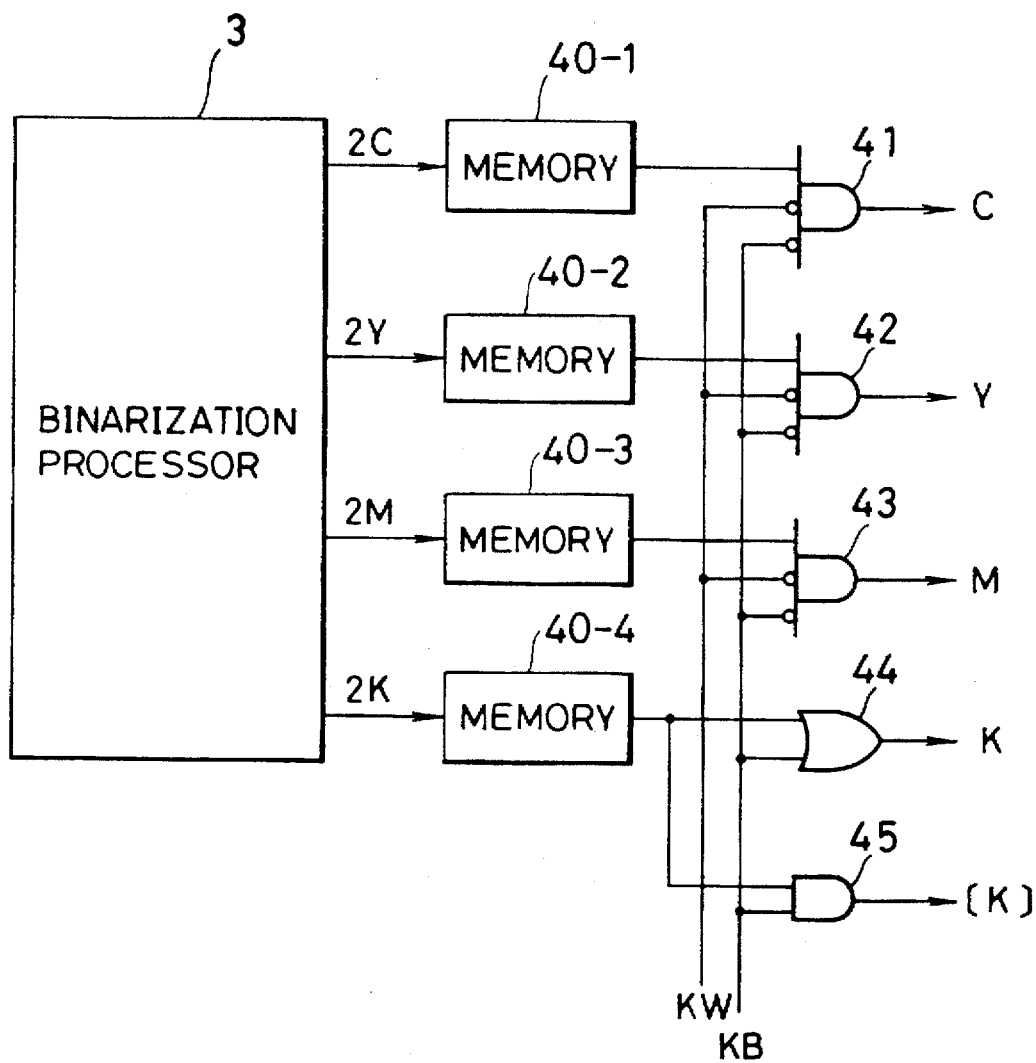
FIG. 7 is a circuit diagram showing a major portion of a recording controller shown in FIGS. 1A and 1B.

FIG. 7 shows delays for that purpose. Four binary recording signals 2C, 2Y, 2M and 2K are delayed by memories 40-1–40-4, and are fed to AND gates 41, 42 and 43, an OR gate 44 and an AND gate 45, respectively. Thus, outputs C, Y, M, K and [K] are produced from the AND gates 41, 42 and 43, the OR gate 44, and the AND gate 45, respectively, in response to the values of signals KB and KW as follows:

When KB=1:

K="1" (a black dot is recorded); and

C, M and Y="0" (no dot is recorded for C, M and Y).

When KW=1:

$$C, M, Y = "0" \quad (4)$$

These K, C, M and Y are outputted from the OR gate 44 and the AND gates 41–43, respectively. The signal [K] produced from the AND gate 45 is a black signal in a text region. The circuit shown in FIG. 7 constitutes a part of the recording controller 4.

Equation (4) means that a black dot is recorded when the black recording signal K determined as an OR of the signals 2K and KB is "1". In this case, when the chrominance components of Y, M and C are contained in that pixel, they are suppressed so as to avoid color mixtures. Furthermore, when KW of a pixel of interest is "1", the chrominance signals of that pixel are also suppressed so that neighboring dots of a black text region are not recorded, thus achieving clearer recording of the text region.

STANDARD RECORDING BY USING COATED PAPER AS RECORDING MEDIUM

An arrangement for carrying out recording on a normal recording medium, such as coated paper, having a comparatively high ink absorption power will be described. This arrangement performs recording based on recording signals obtained as a result of above-described signal processing: the identification of a text region (or generation of the signals KB and KW) by the image identifying processor 14; and controlling of recording signals by the recording controller 4 in accordance with the result of the identification.

Figure 8:
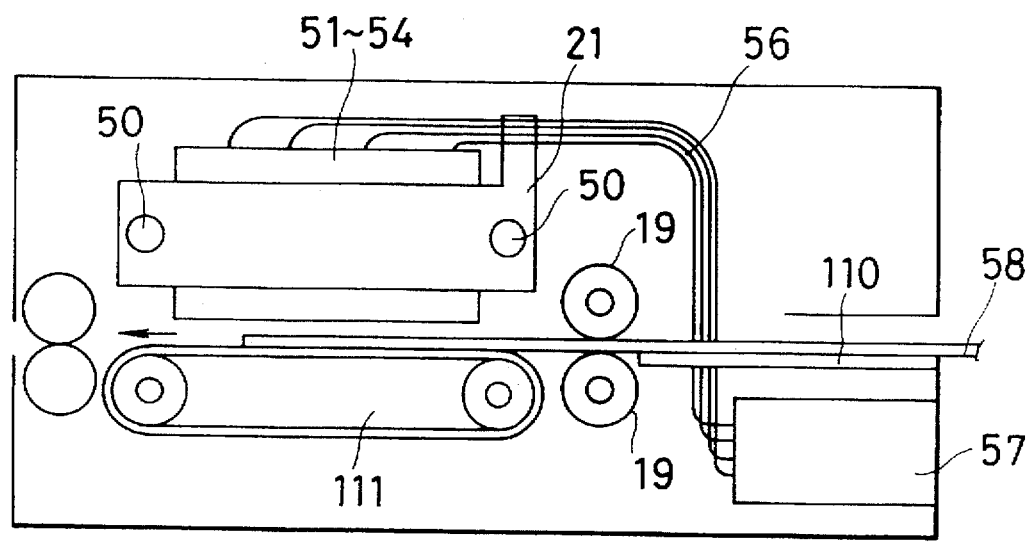
FIG. 8 is a schematic cross-sectional view illustrating an ink jet recording apparatus associated with the first embodiment of the present invention.

FIG. 8 is a cross sectional side view showing a major portion of an ink jet recording apparatus associated with the first embodiment of the present invention. In this figure, reference numerals 51–54 designate recording heads, each of which includes 64 ink orifices. In each ink passage communicating to each one of the orifices, there is provided an electrothermal converting element that generates thermal energy for ejecting ink. The recording heads 51, 52, 53 and 54 are for ejecting inks of black (K), cyan (C), magenta (M) and yellow (Y), respectively, and are supported by a carriage 21. Here, the orifices of each head are aligned in the subscanning direction so that recording by a scanning of each head is superimposed on an identical area.

The carriage 21 is slidably mounted on a pair of guide shafts 50, and is moved in the scanning direction (the direction normal to the sheet of FIG. 8) by a carriage motor described later.

The recording heads 51–54 are electrically connected via the carriage 21 to the recording controller 4 described before with reference to FIGS. 1A and 1B. In addition, the recording heads 51–54 are supplied with inks of respective colors from ink reservoirs in an ink supplying section 57 via a bundle of ink tubes 56 that can flexibly bend in accordance with the movement of the carriage 21. On the other hand, a recording medium 58 is successively incremented in the direction of the arrow to a recording position via a paper guide 110 by a pair of transport rollers 19 with a predetermined timing. At the recording position, the recording medium 58 is attracted to a transport belt 111 by electrostatic attraction, and is transferred with the movement of the belt 111 in synchronism with the transport roller 19. Thus, the recording medium 58 is successively located at the right place to be recorded.

FIG. 1A described before is a block diagram showing an arrangement of the controlling portion of the ink jet recording apparatus as shown in FIG. 8. In FIG. 1A, reference numeral 20 designates a carriage driver comprising a carriage motor that drives the carriage 21 via a carriage driving mechanism such as belts or pulleys. Reference numeral 22 denotes a head driver that produces ejection signals for each orifice of the recording heads 51–54 on the basis of recording data supplied from the recording controller 4. Reference numeral 18 designates a paper feed driver for driving the transport rollers 19 and the transport belt 111. The paper feed driver 18 is mainly composed of a motor.

The recording controller 4 includes a CPU 17, a RAM 16 and a ROM 15. The CPU 17, communicating data with circuits shown in FIG. 7 as well as with a reading device and other devices of the recording apparatus, executes procedures for controlling these circuits and devices. The RAM 16 serves as working areas during the processing of the CPU 17, and the ROM 15 contains the processing procedures for the recording control as shown in FIGS. 9A and 9B, or the like.

Figures 9A, 9B:
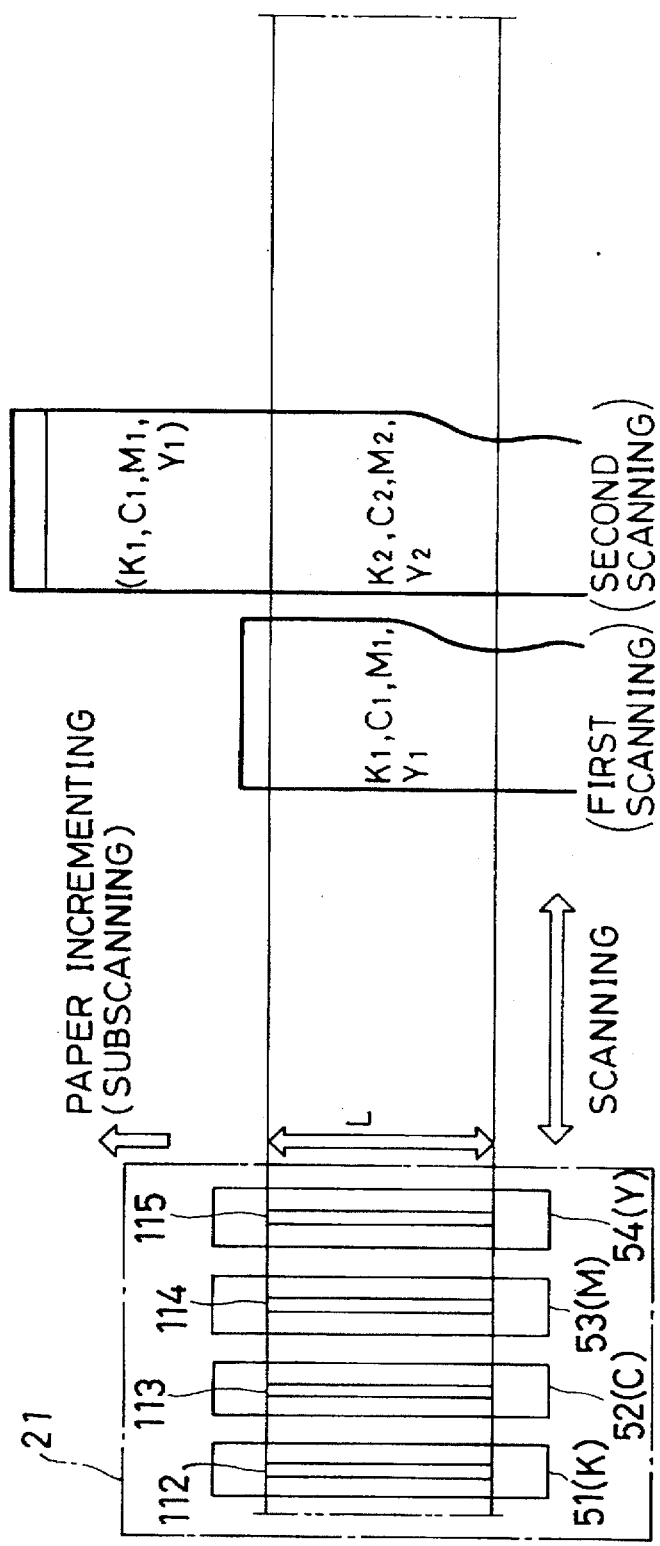
FIG. 9A is a diagram illustrating recording process onto a coated recording medium in the first embodiment.
FIG. 9B is a table illustrating the recording process illustrated in FIG. 9A.

FIGS. 9A and 9B are a diagram and a table for illustrating a recording procedure of the ink jet recording apparatus as shown in FIG. 8. In FIG. 9A, the recording heads 51–54 for ejecting inks of K, C, M and Y, respectively, are fixed to the carriage 21 so that recording areas formed by each recording head during a scanning overlap completely. In this figure, orifice lines 112–115 are shown for convenience as if they could be seen from above, although they cannot be actually seen from above.

The recording heads 51–54 perform recording on a recording medium by ejecting inks from the orifices 112–115 in response to recording signals inputted in synchronism with the movement of the carriage 21. The recording medium 58 is incremented by a length L of the recording area every time the carriage 21 scans, by means of the pair of transport rollers 19 and the transport belt 111, and the recording is performed in the sequence of K, C, M and Y.

On the basis of the above arrangement, a section of a color image of a head length L is formed in a first scanning on a first recording area of a length L by superimposing recording of recording signals K1, C1, M1 and Y1 by using the recording heads 51, 52, 53 and 54. After the first section is recorded on the first recording area, paper incrementing is carried out by the amount equal to the head length L, and the next section of the color image is formed on a second recording area by the succeeding recording signals K2, C2, M2 and Y2. Thus, the color image, on which the above-described image processing is performed, is being formed by the scanning of the carriage 21 and the paper incrementing by the length L, and the recording medium is fed out when the recording of the sheet is completed.

RECORDING CONTROL FOR A SPECIAL RECORDING MEDIUM

As described before, processing the image recording signal by simply detecting text regions and controlling the recording signals in accordance with the detected results is not enough to realize a high quality recording of black text regions, when noncoated paper such as paper for plain paper copy, or transparent paper for an overhead projector which hinders spreading of ink dots and has a low chromogenic characteristic is used.

For this reason, the present invention offers another aspect of recording control based on recording medium identifying processing. This will be described below.

Figure 10:
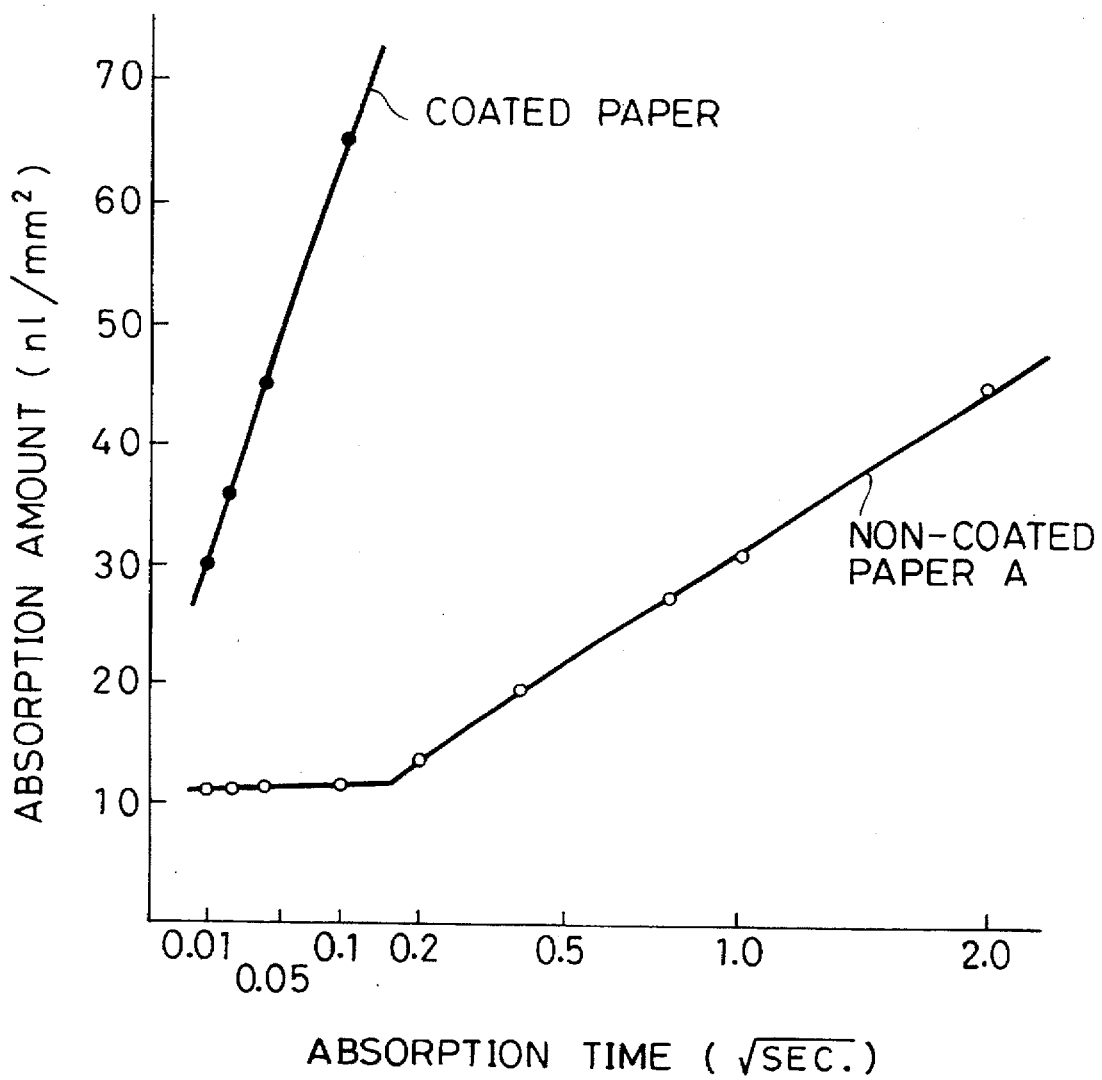
FIG. 10 is a graph illustrating ink absorption characteristics of coated paper and noncoated paper.

FIG. 10 is a graph comparatively illustrating ink absorption characteristics of coated paper and noncoated paper A. In this graph, the axis of abscissas represents a root of absorption time ($\sqrt{S}$), and the axis of ordinates represents an absorption amount (nl/mm$^2$) of water based ink. It is found from FIG. 10 that coated paper, having ink accepting layer thereon, can absorb a great deal of ink in a short time, but that noncoated paper used in this embodiment requires a long time to absorb ink because of low initial absorption.

FIG. 11 is a table showing examination results of spreading degrees of ink in terms of clearness of boundaries of two color inks when the two color inks are deposited substantially simultaneously onto a recording medium. In this table, circles indicate usability, triangles indicate poor quality, and crosses indicate non-usability.

Figures 12A, 12B:
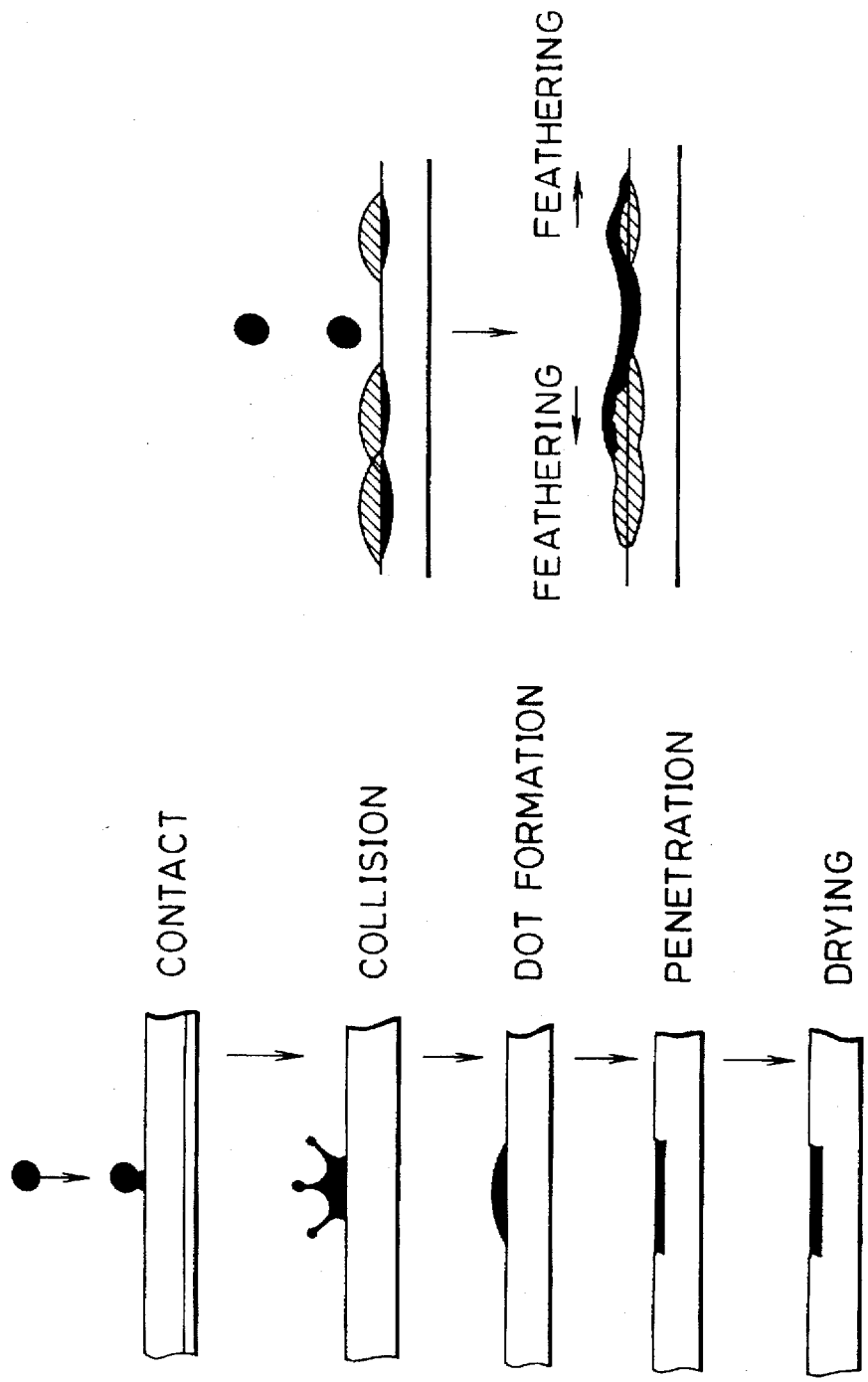
FIGS. 12A and 12B are views for explaining ink absorption into a recording medium.

From this experiment, it is found that the density of ink that can be recorded in a short time is less than 20 nl/mm$^2$ for noncoated paper, and less than 25 nl/mm$^2$ for coated paper. An ink absorption phenomenon is supposed to arise from the mechanism shown in FIGS. 12A and 12B.

The absorption of ink into paper is supposed to have steps of contact, collision, dot formation, penetration and drying. As shown in FIG. 10, noncoated paper cannot absorb ink more than 11–12 l/mm$^2$ in less than 0.2 $\sqrt{sec}$. Consequently, greater amount of ink simultaneously deposited on the noncoated paper runs, and the running ink is pulled to adjacent ink previously deposited on the paper, thus resulting in feathering at the boundaries of inks.

Transparent paper can be processed into coated paper by providing ink accepting layer. Generally, nonabsorptive PET film on which absorptive resin is thinly coated is extensively used to ensure transparency for projection. Therefore, with regard to transparent paper which is coated for ink jet recording, the ink absorption amount cannot be increased. Although initial absorption rate can be increased, it soon saturates, and the absorption rate reduces beyond the saturation. In connection with this, vaporization of ink becomes necessary. Thus, high surface density ink deposition onto the transparent paper will cause feathering at boundaries as in noncoated paper, and hence, the surface density of ink deposition has its limit. In addition, spreading ratio as well as intensity level of ink cannot be increased as in coated paper.

For these reasons, in this embodiment, recording control is adjusted in accordance with a type of a recording medium which is indicated by the signal P transferred from the recording medium identifying portion 10 as shown in FIG. 1A. In other words, when using a recording medium inferior in ink absorption power or in chromogenic characteristics, such as transparent paper or plain paper, the recording method as shown in FIGS. 13A and 13B is employed.

Figures 13A, 13B:
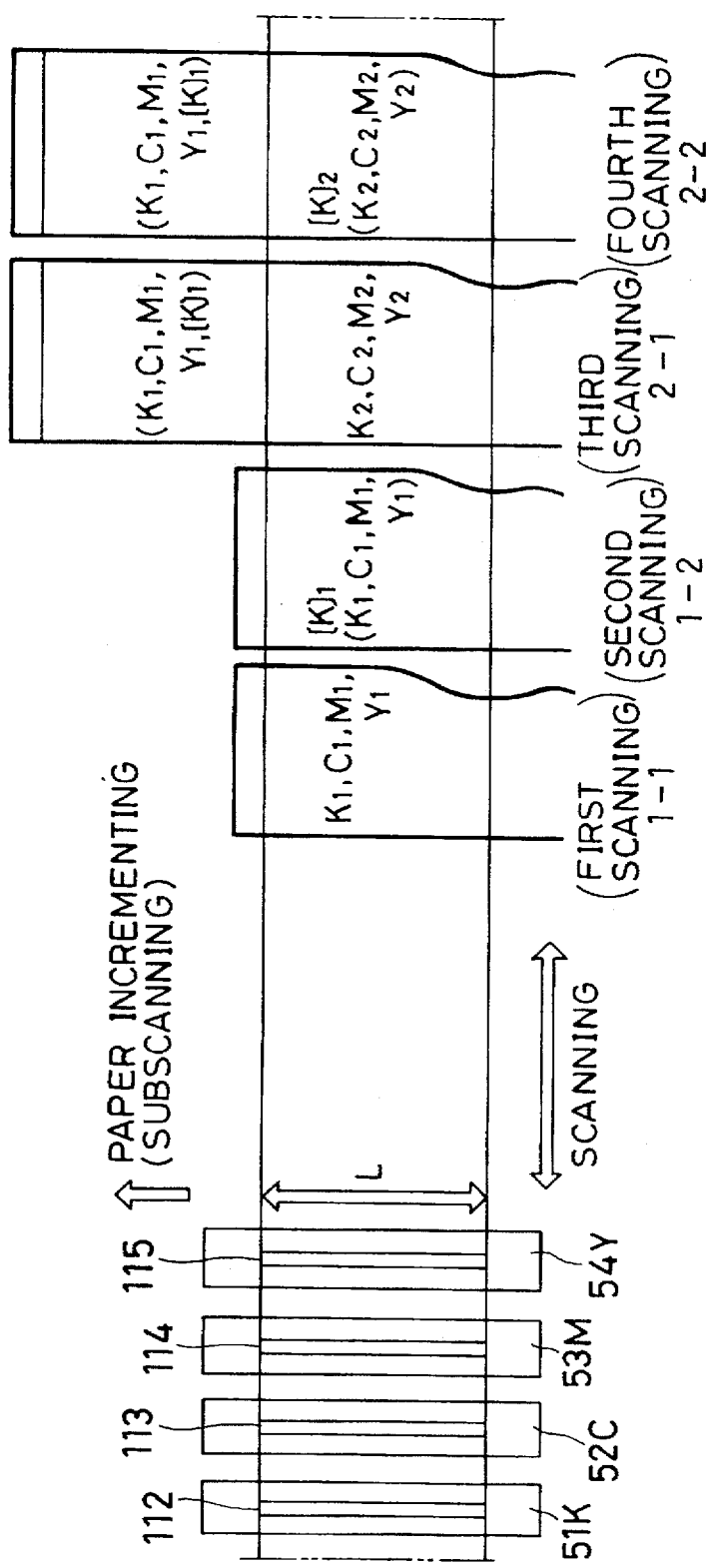
FIG. 13A is a diagram illustrating recording process onto a recording medium of low ink absorption power such as transparent paper for an overhead projector or noncoated paper by the first embodiment of the present Invention.
FIG. 13B is a table illustrating the recording process illustrated in FIG. 13A.

FIGS. 13A and 13B are figures corresponding to FIGS. 9A and 9B. In FIGS. 13A and 13B, the first scanning (1-1) performs color recording to a first recording region with the recording heads 51, 52, 53 and 54 to which recording signals K1, C1, M1 and Y1 are supplied. In this case, these recording signals are formed by processing input signals in accordance with identification result of a text region or a halftone region by the image identifying processor 14. In this first scanning, although four inks are simultaneously deposited, reduction in resolution can be prevented. Reasons for this are as follows: first, text regions are recorded only by K ink by means of the K head 51, and hence, the K ink is not pulled by the other color inks, resulting in high resolution; second, an amount of ink ejection is restricted in accordance with a spreading ratio, which impedes pulling between the K ink, resulting in reduction of feathering.

Likewise, recording of halftone regions is also carried out with restricted ink ejection. Accordingly, pulling between different color inks is reduced so that an image of good gradation can be reproduced although intensity level may slightly reduce.

After the four inks have formed a color image in the first recording area of length L by the first scanning (1-1), a second scanning (1-2) is performed on the first recording area without incrementing paper. In the second scanning (1-2), only [K]1 data that is defined as K data of text regions (excluding K data of halftone regions), as shown in FIG. 7, are recorded again by using the K head 51. The data [K]1 may be produced either by reading the same position of the document once again, or by storing the text regions of the first data K1 in an RAM or the like, and by reading them at the second recording. In the second scanning, K ink is deposited again on the previously formed text regions by K ink as mentioned above.

Figure 14:
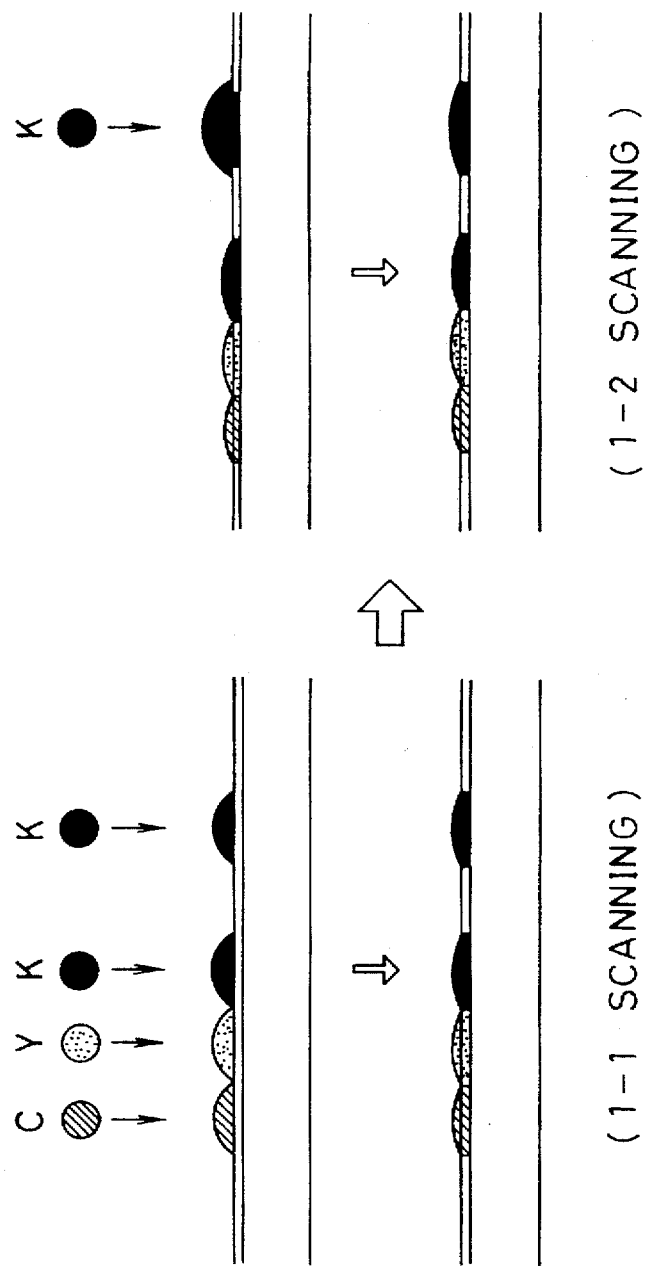
FIG. 14 is a schematic cross-sectional view illustrating an ink spreading manner into a recording medium in the recording of FIG. 13B.

FIG. 14 illustrates recording of a halftone region formed by depositing K, C and Y inks once and of a text region formed by depositing K ink twice. It is found from this figure that although the second K ink is deposited on the first K ink before the first K ink has been fixed (absorbed and dried), intensity level can be increased with little reduction in resolution even if the second ink is somewhat pulled by the first ink. After the two scannings have formed a color image on the first recording area by using K1, C1, M1, Y1 and [K]1 inks, the paper is incremented by the length L as shown in FIGS. 13A and 13B. Subsequently, a third scanning (2-1) and a fourth scanning (2-2) are executed so that recording onto a second recording area of length L is achieved.

In such procedures, recording is sequentially carried out. Thus, even when a recording medium of low absorption and low chromogenic characteristics, such as transparent paper or plain paper, is used, text regions are recorded with high intensity level without reducing resolution, and halftone regions of practically sufficient gradation and resolution can be obtained, although their intensity level may be a little low.

Recording test for estimating the effect of this embodiment was conducted under predetermined conditions, and images having little practical problems were obtained. In contrast with this, when superimposing printing was simply performed without identifying image regions, degradation of images by feathering was conspicuous in halftone regions. On the contrary, when no superimposing printing was performed, text regions were thin and lacking in density so that no practical image was obtained. In addition, although intensity level enhancement was tried by increasing amounts of ink ejection without carrying out superimposing recording, degradation of images in halftone regions was conspicuous, and hence, none of these images could be practically used.

In this embodiment, text regions are recorded by double scanning so that they are recorded twice. In this case, sharp reduction in recording rate can be prevented by taking the following steps: first, enabling recording by using reciprocating scanning; second, storing [K] data of text regions in a memory; and third, the [K] data is over-printed during backward subscanning in a reciprocating scanning.

Furthermore, although slight color may appear in a recorded image, thickness enhancement in text regions is possible without increasing the number of scanning by superimposing two color inks K and C for text regions, and by printing halftone regions with four inks K, C, M and Y. Thus, decrease in recording speed can be prevented. Moreover, text regions may be printed by superimposing three color inks K, M and C.

Embodiment 2

Figure 15:
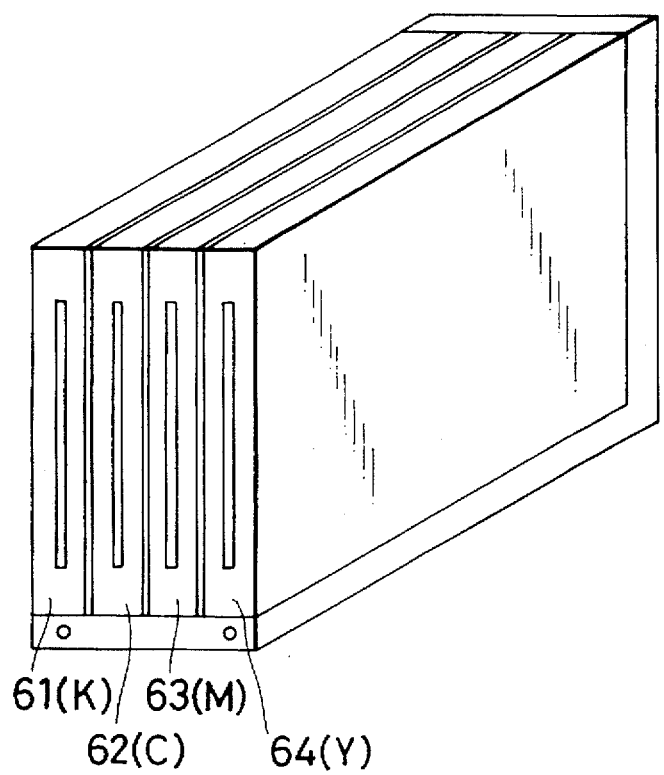
FIG. 15 is a perspective view of an ink jet recording head unit employed to a second embodiment of an ink jet recording apparatus of the present invention.

FIG. 15 is a perspective view of a recording head associated with a second embodiment. The recording head includes four ink heads integrally arranged into a head cartridge which is adapted for full-color recording. More specifically, it integrally includes recording heads 61-64, each corresponding to one of the black (K), cyan (C), magenta (M), and yellow (Y), and their ink reservoirs.

Each recording head includes 128 orifices aligned in the subscanning direction. This recording head is a disposable cartridge type including ink reservoirs as its integral parts, and hence, when ink is exhausted, the cartridge is replaced with another cartridge incorporating ink reservoirs and recording heads.

High resolution recording as in this embodiment requires high registration accuracy between recording heads. When four color recording heads are integrally replaced as in this embodiment, it becomes possible to perform precise registration. This enables an apparatus using a disposable type recording head to achieve high quality image recording by utilizing its capability to the full extent.

In this second embodiment, a recording method of the first embodiment is replaced by a new recording method, which is one of the features of the present invention. Accordingly, it is not necessary to change the construction of the image identifying portion.

Figures 16A, 16B:
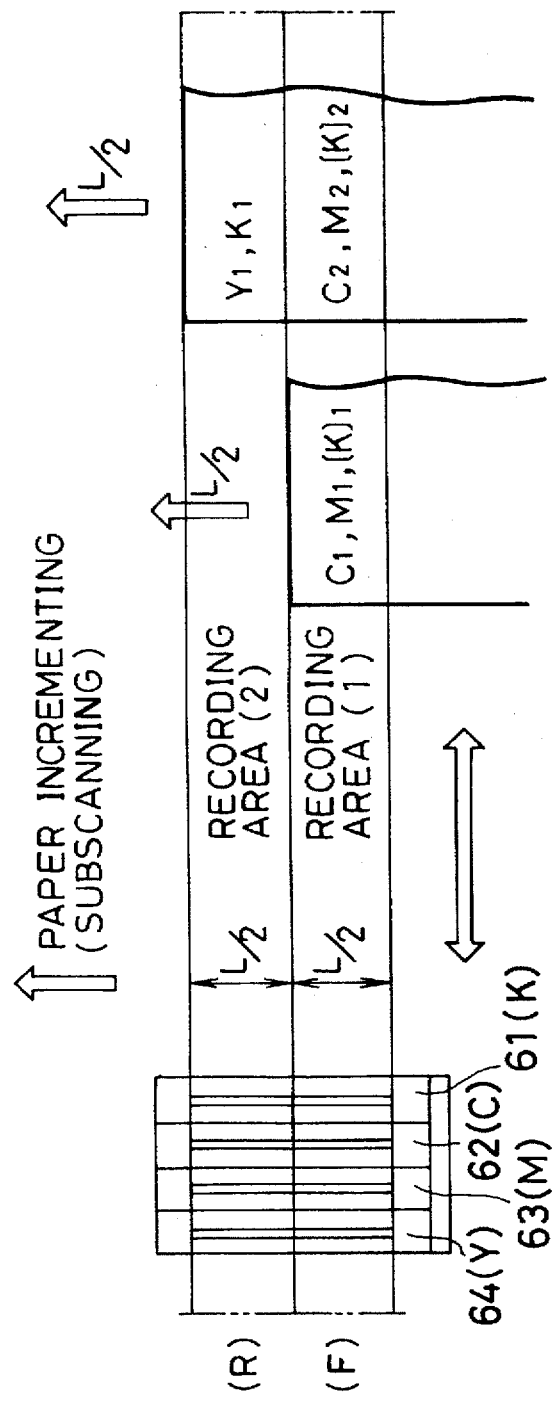
FIG. 16A is a diagram illustrating recording process by the second embodiment of the present invention.
FIG. 16B is a table illustrating the recording process illustrated in FIG. 16A.

FIGS. 16A and 16B, corresponding to FIGS. 13A and 13B, are a diagram and a table illustrating a recording method by using the recording heads shown in FIG. 15.

This is an example for performing 600 DPI (dots per inch) recording on double size paper. The recording density of 600 DPI specifies a side length of a square pixel at 42.33 µm, a droplet diameter at 30 µm, and its volume at 14.2 pl.

As a result, when one color ink, two, three, and four color inks are deposited on a recording medium so as to be superimposed or adjacent each other, surface densities are 7.9 nl/mm$^2$, 15.8 nl/mm$^2$, 23.7 nl/mm$^2$ and 31.6 nl/mm$^2$, respectively. Taking account of this, the tolerance in which no ink feathering occurs is up to two color inks in this embodiment (see, FIG. 11).

Therefore, it becomes possible to perform recording as shown in FIG. 16A when transparent paper or plain paper are used: each of the recording head 61-64 is divided into two sections so that an identical recording area is recorded by two different heads corresponding to two color inks, in addition to black ink [K] of text regions. For example, forward sections F of the recording heads 61, 63 and 62 corresponding to K, M and C inks, and rear sections R of the recording heads 64 and 61 corresponding to Y and K inks can record to the same recording area. Thus, 153 times of scanning with the data sequence as shown in FIG. 16B makes it possible to complete recording to A3 size paper.

With this arrangement, the number of color inks simultaneously deposited on halftone regions is restricted to two colors. Consequently, even when enough amounts of ink are deposited onto a recording medium as mentioned above, degradation of an image by ink running is restricted to a minimum, thereby resulting in practically sufficient intensity level. Furthermore, with regard to text regions, intensity level can be further increased than in double recording by K ink only, and the reduction in resolution can be restricted.

Figure 17:
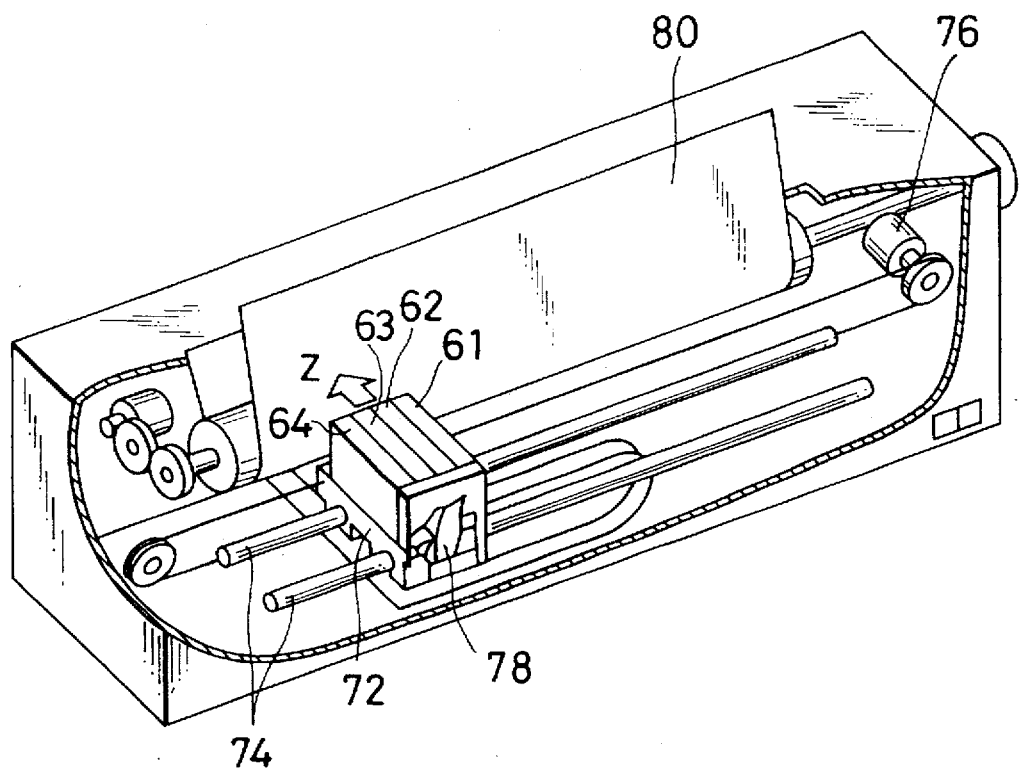
FIG. 17 is a schematic perspective view showing the second embodiment of an ink jet recording apparatus according to the present invention.

FIG. 17 is a perspective view showing an ink jet recording apparatus on which the recording head shown in FIGS. 15 and 16A can be mounted. A carriage 72 is slidably mounted on guide shafts 74, and is driven by a carriage motor 76 so that the recording heads 61-64 can scan on a recording area.

The number of recording areas assigned to an area corresponding to the head length can be arbitrarily determined. This setting can be executed by adjusting the amount of paper incrementing and recording signals supplied to the recording heads by the recording controller 4 having the arrangement as shown in FIGS. 1A and 1B. This enables the apparatus to record onto a recording medium of poor ink absorption power, such as plain paper or transparent films for an OHP, thus diversifying types of recording mediums that can be used.

As described above, an apparatus of this embodiment increments a recording medium by the length of a divided recording area for each scanning, and performs recording with predetermined orifices corresponding to the recording area by using a plurality of recording heads in response to the incrementation of the recording medium.

As a result, an ink deposition area in one scanning can be narrowed without scarcely increasing the number of scanning compared with a recording method in which each color ink is ejected over the entire length of the head without dividing the recording heads into sections. Furthermore, the present embodiment has an advantage to restrict paper undulation. Generally speaking, increasing amount of ink ejection or of ink deposit causes paper undulation phenomenon, because the paper swells, expands or contracts by accepting ink. This embodiment, however, can limit the undulation because an area of a maximum ink deposition density at each instant becomes smaller than that when the recording head is not divided into sections. Consequently, it is not necessary to unduly separate the distance between the head and the recording medium. This makes it possible to improve landing precision of ink and the quality of images.

Generally, image degradation due to differences in landing precision, in ejection amounts or the like among the orifices are enhanced by superimposing recording. The degradation, however, is not enhanced but reduced in a great deal of cases by using the orifices divided into sections.

Furthermore, as described before, ink deposition density becomes very high in superimposing recording using a plurality of color inks. Therefore, in a conventional method in which paper incrementing is performed each time a predetermined times of scanning are completed so that recording of the next line is started, ink accepting amount is greatly different between the lines. As a result, image degradation (intensity unevenness) at the joint boundary of the scanning lines, which is supposed to be caused by an ink absorbing phenomenon of the next line, is liable to occur at that boundary, and ink running in the paper incrementing direction of the preceding line becomes large.

In contrast with this, in this second embodiment, since ink accepting amounts change gradually line by line, the above-mentioned degradation is lessened.

In addition, although in this second embodiment, only text regions are recorded by K ink in the first scanning as indicated by [K]1, C1 and M1 in FIGS. 16A and 16B, [K]1 data (K only for text regions) can be replaced by K1 data (K for both text and halftone regions) depending on a purpose of an output image or on the absorption characteristic of a recording medium. In such a case, not only text regions but also halftone regions are deposited twice by K ink so that an image of clear appearance can be obtained.

Embodiment 3

Next, a third embodiment of the present invention will be described.

This is an example for performing 300 DPI (dots per inch) monochromatic recording. Orifices of a recording head are defined considering double size paper. Thus, parameters are determined as follows: a dimension of a square pixel is 84.67 μm; a diameter of a pixel dot is 120 nm; a diameter of a droplet is 60 nm, a volume of the droplet is 113 pl; and the surface density of monochromatic ink is 15.8 nl/mm$^2$.

In the case where the recording density is low as in this embodiment, feathering between the scanning lines can occur even in the monochrome recording.

Figure 18:
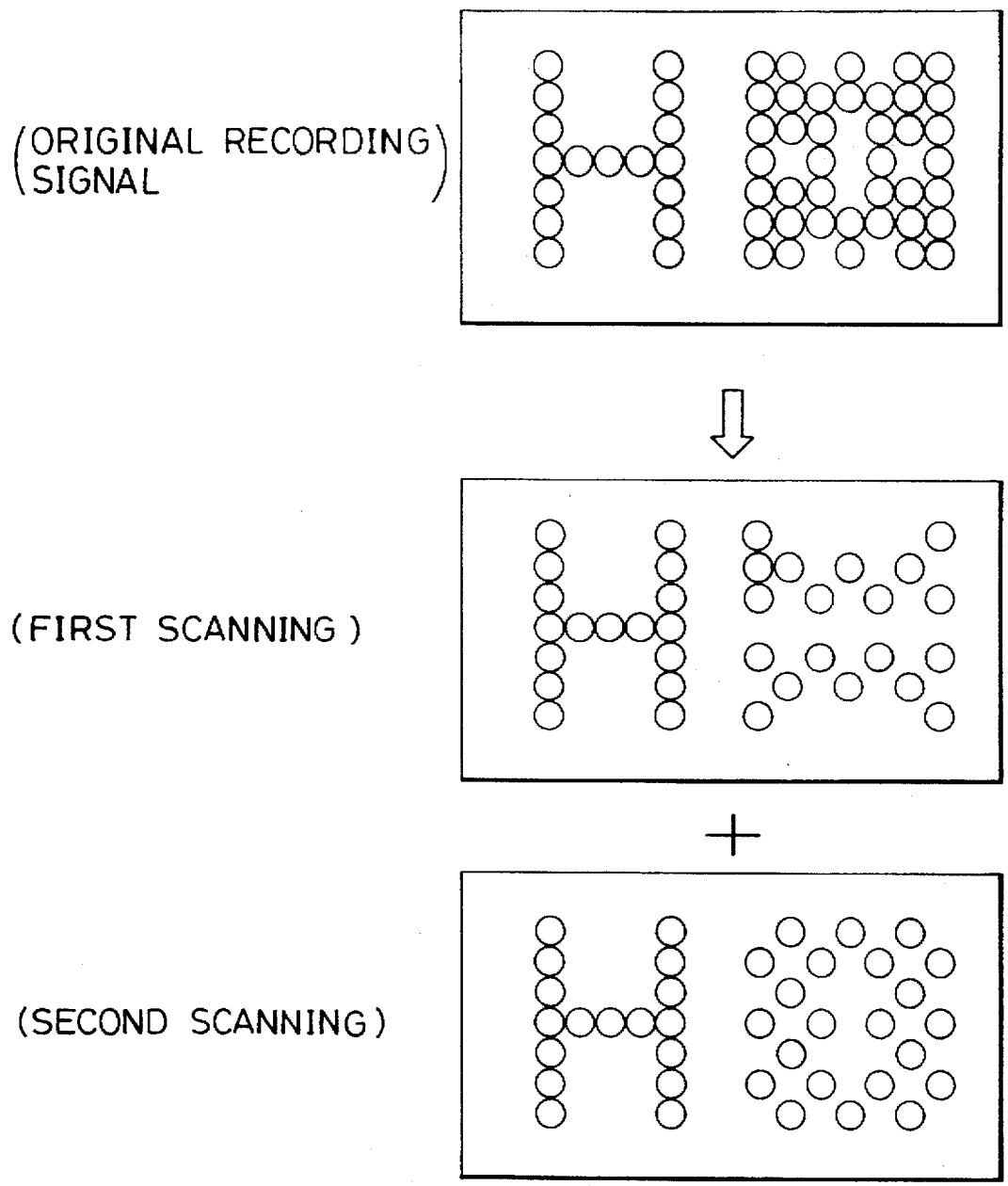
FIG. 18 is a plan view illustrating recording method by a third embodiment of an ink jet recording apparatus according to the present invention.

For this reason, in this embodiment, the volume of droplets is set at a little smaller side, and ink deposition is performed twice in text regions, but once in halftone regions. Thus, even when poor absorption paper, such as transparent paper or plain paper, is used, a good image can be produced. Further, another method can be used in this embodiment rather than reducing the ink ejection volume: halftone regions are recorded by separately depositing ink twice in staggered patterns in a first scanning and in counter-staggered patterns in a second scanning as shown in FIG. 18; and text regions are recorded by depositing ink twice using the same data.

Figure 19A:
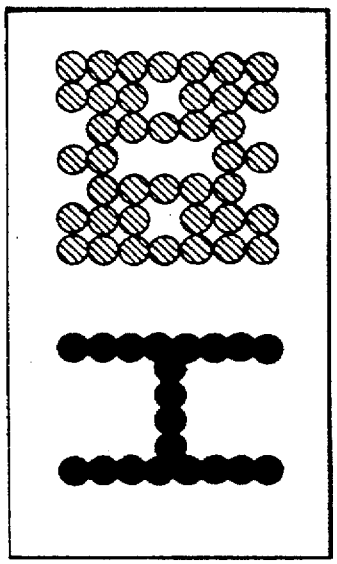
FIGS. 19A–19C are plan views illustrating a recording result of the third embodiment in comparison with conventional examples.
Figure 19B:
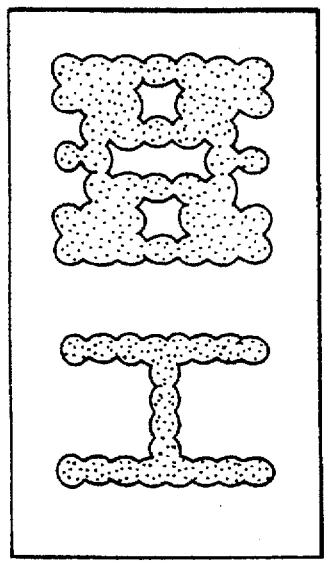
Figure 19C:
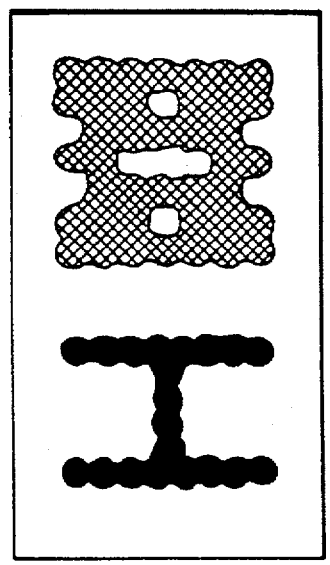

FIGS. 19A–19C comparatively illustrate ink spreading when recording is performed on transparent paper: FIG. 19A illustrates a sample of the third embodiment in which the text region is printed by the double deposition of ink, and the halftone region is printed by separately depositing ink in a staggered pattern and in a counter-staggered pattern; FIG. 19B is a sample of single deposition of ink; and FIG. 19C is a sample of simple double deposition of ink.

Although in this embodiment, only one K ink head is used, another K ink recording head can be added so that the scanning number can be reduced.

In addition, identification of text regions in this embodiment can be carried out without using portions associated with color signals in the image identification of the first embodiment, or other known process for identification can be used.

Ink jet recording apparatuses disclosed in the embodiments above can be applied not only to copying machines or to other machines employing printers, such as facsimiles, but also to word processors, microcomputers, or other information processing systems using these machines as output devices.

SUPPLEMENT

The present invention achieves a distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/ 1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet recording apparatus for performing recording on a recording medium by depositing ink onto the recording medium in response to a recording data signal, said apparatus comprising:

a plurality of recording heads for ejecting inks;

moving means for relatively moving said recording heads and said recording medium;

image identifying means for identifying a recording data signal corresponding to a text region which includes at least one of a part of a character and a line thinner than a predetermined thickness, and for identifying a recording data signal corresponding to a halftone region including a dot image; and recording controlling means for controlling said recording heads to perform recording twice for the text region, and once for the halftone region.

2. An ink jet recording apparatus as claimed in claim 1, wherein said image identifying means comprises:

black signal generating means for generating a first black signal by suppressing chromatic components of said recording data signal;

black signal binarizing means, connected to an output of said black signal generating means, for binarizing said first black signal outputted from said black signal generating means; and black image identifying means, connected to an output of said black signal generating means, for identifying said text regions, or said halftone regions on the basis of the binary first black signal.

3. An ink jet recording apparatus as claimed in claim 2, wherein said black signal generating means comprises:

a maximum value detector for detecting a maximum value of R, G and B components of said recording data signal;

a minimum value detector for detecting a minimum value of the R, G and B components of said recording data signal;

a subtracter for subtracting said minimum value from said maximum value;

a multiplier for multiplying an output of said subtracter by a predetermined fixed value;

an adder for adding said maximum value and an output of said multiplier; and a limiter for limiting an output of said adder.

4. An ink jet recording apparatus as claimed in claim 2, wherein said black signal binarizing means comprises:

means for producing first black signals of a pixel of interest and its neighboring pixels;

averaging means for calculating an average value of said first black signals of said pixel of interest and its neighboring pixels;

first comparing means for comparing said average value with the black signal of said pixel of interest to produce a second black signal of said pixel of interest representing that said pixel of interest is black; and second comparing means for comparing a difference of said average value and the first black signal of said pixel of interest with a predetermined value to produce a differential signal representative of difference between a black level of said pixel of interest and an average value of black levels of its neighboring pixels.

5. An ink jet recording apparatus as claimed in claim 4, wherein said black image identifying means comprises:

means for producing second black signals of a pixel of interest and of its neighboring pixels by delaying said second black signal outputted from said first comparing means;

means for producing an isolation indicating signal of the pixel of interest by comparing the second black signal of the pixel of interest with the second black signals of its neighboring pixels;

means for producing a third black signal representing that the pixel of interest is black when said isolation indicating signal, said second black signal and said differential signal of said pixel of interest are all indicating black level, and means for producing a fourth black signal representing that the pixel of interest is a part of text region based on said third black signals of the pixel of interest and of its neighboring pixels.

6. An ink jet recording apparatus as claimed in claim 5, further comprising recording data signal processing means for processing said recording data signal based on an identification result by said image identifying means.

7. An ink jet recording apparatus as claimed in claim 6, wherein said recording data signal processing means suppresses said color components of said recording data signal when said fourth black signal indicates that the pixel of interest is in a text region.

8. An ink jet recording apparatus as claimed in claim 7, wherein said recording controlling means controls said recording heads so that each color component of said recording data signal is directly recorded.

9. An ink jet recording apparatus as claimed in claim 1, further comprising subscanning means for effecting relative movement of said recording heads and said recording medium in a subscanning direction substantially perpendicular to the moving direction of said recording heads by said moving means, after completing a recording while moving said recording heads by said moving means, wherein said recording heads comprise four heads, each of which corresponds to each one of four colors of black, cyan, magenta and yellow, and is divided into a plurality of sections each including a plurality of orifices aligned along the subscanning direction, and said recording controlling means controls said recording heads so that selected sections sequentially eject ink.

10. An ink jet recording apparatus as claimed in claim 9, wherein a first recording of said text region is performed while said recording heads are moving in a forward direction of the moving direction of said recording heads, and a second recording of said text region is performed while said recording heads are moving in a backward direction of the moving direction of said recording heads.

11. An ink jet recording apparatus as claimed in claim 1, wherein each of said recording heads generates film boiling which grows bubbles for expelling ink by using thermal energy.

12. An ink jet recording apparatus as claimed in claim 1, wherein said recording heads include two or more recording heads for ejecting black ink.

13. An ink jet recording apparatus as claimed in claim 1, wherein said text region contains at least one of a part of a character and a thin line thinner than a predetermined thickness, and said halftone region contains a continuous halftone portion or a dot image portion.

14. An ink jet recording apparatus as claimed in claim 1, wherein each of said recording heads ejects ink of a predetermined color, at least one of said recording heads ejecting black ink, and said recording controlling means controls recording such that said text region is recorded by said recording head ejecting black ink.

15. An ink jet recording apparatus as claimed in claim 1, wherein each of said recording heads ejects ink of a predetermined color, at least one of said recording heads ejecting black ink, and said recording controlling means controls recording such that said text region and said halftone region are recorded by said plurality of recording heads, and said text region is recorded by said recording head ejecting black ink.

16. An ink jet recording method for forming on a recording medium an image including a text region that contains at least one of a part of a character and a thin line thinner than a predetermined thickness, and a halftone region that contains a dot image by ejecting ink from recording heads in response to a recording data signal, said method comprising the steps of:

identifying the text region and the halftone region of said image on the basis of said recording data signal;

separating recording data associated with a plurality of colors in said halftone region into first recording data and second recording data, said first recording data and said second recording data being complementary to each other;

recording in a first recording step the first recording data of said halftone region and recording data of said text region; and recording in a second recording step the second recording data of said halftone region and the recording data of said text region identical to the recording data of said text region recorded in said first recording step.

17. An ink jet recording method as claimed in claim 16, wherein said step of identifying the text region and the halftone region comprising the steps of:

generating a first black signal by suppressing chromatic components of said recording data signal;

binarizing said first black signal; and identifying said text regions or said halftone regions on the basis of the binarized first black signal.

18. An ink jet recording method as claimed in claim 17, wherein said step of generating a first black signal comprises the steps of:

detecting a maximum value of R, G and B components of said recording data signal;

detecting a minimum value of the R, G and B components of said recording data signal;

subtracting said minimum value from said maximum value;

multiplying an output of said subtracting step by a predetermined fixed value;

adding said maximum value and an output of said multiplying step; and limiting an output of said adding step.

19. An ink jet recording method as claimed in claim 17, wherein said step of binarizing said first black signal comprises:

producing first black signals of a pixel of interest and its neighboring pixels;

calculating an average value of said first black signals of said pixel of interest and its neighboring pixels;

comparing, in a first comparing step, said average value with the black signal of said pixel of interest to produce a second black signal of said pixel of interest representing that said pixel of interest is black; and comparing, in a second comparing step, a difference of said average value and the first black signal of said pixel of interest with a predetermined value to produce a differential signal representative of a difference between a black level of said pixel of interest and an average value of black levels of its neighboring pixels.

20. An ink jet recording method as claimed in claim 19, wherein said step of identifying said text region or said halftone region further comprises:

producing second black signals of a pixel of interest and of its neighboring pixels by delaying said second black signal outputted in said first comparing step;

producing an isolation indicating signal of the pixel of interest by comparing the second black signal of the pixel of interest with the second black signals of its neighboring pixels;

producing a third black signal representing that the pixel of interest is black when said isolation indicating signal, said second black signal and said differential signal of said pixel of interest are all indicating black level; and producing a fourth black signal representing that the pixel of interest is a part of text region based on said third black signals of the pixel of interest and of its neighboring pixels.

21. An ink jet recording method as claimed in claim 16, wherein said first recording data is associated with a staggered pattern of said halftone region, and said second recording data is associated with a counter-staggered pattern of said halftone region, said counter-staggered pattern being a complement of said staggered pattern.

22. An ink jet recording method as claimed in claim 16, wherein said step of separating recording data performs the separation for each color of a plurality of colors in said halftone region.

23. An ink jet recording method as claimed in claim 16, wherein the text region contains at least one of a part of a character and a thin line thinner than a predetermined thickness, and the halftone region contains a continuous halftone portion or a dot image portion.

24. An ink jet recording method as claimed in claim 16, wherein each of said recording heads ejects ink of a predetermined color, at least one of said recording heads ejecting black ink, and further comprising the step of controlling recording such that the text region is recorded by the recording head ejecting black ink.

25. An ink jet recording method as claimed in claim 16, wherein each of the recording heads ejects ink of a predetermined color, at least one of the recording heads ejecting black ink, and further comprising the step of controlling recording such that the text region and the halftone region are recorded by the plurality of recording heads, and the text region is recorded by the recording head ejecting black ink.

26. An ink jet recording apparatus as claimed in claim 16, wherein one of the first and second recording steps is performed while the recording heads are moving in a forward direction of the moving direction of the recording heads, and the other of said first and second recording steps is performed while the recording heads are moving in a backward direction of the moving direction of the recording heads.

27. An ink jet recording apparatus for performing recording on a recording medium by depositing ink onto the recording medium in response to a recording data signal, said apparatus comprising:

a plurality of recording heads for ejecting inks;

moving means for causing relative movement of said recording heads and said recording medium;

recording medium identifying means for identifying a type of said recording medium;

image identifying means for identifying a recording data signal corresponding to a text region which includes at least one of a part of a character and a line thinner than a predetermined thickness, and for identifying a recording data signal corresponding to a halftone region including a dot image;

recording data signal processing means for processing said recording data signal based on an identification result by said image identifying means; and recording controlling means for controlling, when said recording medium identifying means identifies that the recording medium is of low ink absorption, said recording heads so that said recording data signal corresponding to said halftone region is recorded once, while said recording data signal corresponding to said text region is recorded twice, on the same area.

28. An ink jet recording apparatus as claimed in claim 27, further comprising discharge volume control means for controlling the volume of ink expelled from said recording heads, wherein said recording controlling means controls, when said recording medium identifying means identifies that the recording medium is of low ink absorption, said discharge volume control means so that the volume of ink expelled from said recording heads is reduced.

29. An ink jet recording apparatus as claimed in claim 27, wherein said image identifying means comprises:

black signal generating means for generating a first black signal by suppressing chromatic components of said recording data signal;

black signal binarizing means, connected to an output of said black signal generating means, for binarizing said first black signal outputted form said black signal generating means; and black image identifying means, connected to an output of said black signal generating means, for identifying said text regions or said halftone regions on the basis of the binary first black signal.

30. An ink jet recording apparatus as claimed in claim 29, wherein said black signal generating means comprises:

a maximum value detector for detecting a maximum value of R, G and B components of said recording data signal;

a minimum value detector for detecting a minimum value of the R, G and B components of said recording data signal;

a subtracter for subtracting said minimum value from said maximum value;

a multiplier for multiplying an output of said subtracter by a predetermined fixed value;

an adder for adding said maximum value and an output of said multiplier; and a limiter for limiting an output of said adder.

31. An ink jet recording apparatus as claimed in claim 29, wherein said black signal binarizing means comprises:

means for producing first black signals of a pixel of interest and its neighboring pixels;

averaging means for calculating an average value of said first black signals of said pixel of interest and its neighboring pixels;

first comparing means for comparing said average value with the black signal of said pixel of interest to produce a second black signal of said pixel of interest representing that said pixel of interest is black; and second comparing means for comparing a difference of said average value and the first black signal of said pixel of interest with a predetermined value to produce a differential signal representative of a difference between a black level of said pixel of interest and an average of black levels of its neighboring pixels.

32. An ink jet recording apparatus as claimed in claim 31, wherein said black image identifying means comprises:

means for producing second black signals of a pixel of interest and of its neighboring pixels by delaying said second black signal outputted from said first comparing means;

means for producing an isolation indicating signal of the pixel of interest by comparing the second black signal of the pixel of interest with the second black signals of its neighboring pixels;

means for producing a third black signal representing that the pixel of interest is black when said isolation indicating signal, said second black signal and said differential signal of said pixel of interest are all indicating black level; and means for producing a fourth black signal representing that the pixel of interest is a part of the text region based on said third black signals of the pixel of interest and of its neighboring pixels.

33. An ink jet recording apparatus as claimed in claim 32, wherein said recording data signal processing means suppresses said color components of said recording data signal when said fourth black signal indicates that the pixel of interest is in the text region.

34. An ink jet recording apparatus as claimed in claim 33, wherein said recording controlling means controls said recording heads so that each color component of said recording data signal is directly recorded.

35. An ink jet recording apparatus as claimed in claim 27, wherein said recording heads comprise four heads, each of which corresponds to each one of four colors of black, cyan, magenta and yellow, and is divided into a plurality of sections each including a plurality of orifices aligned along a subscanning direction, and said recording controlling means controls said recording heads so that selected sections sequentially eject ink.

36. An ink jet recording apparatus as claimed in claim 27, wherein each of said recording heads generates film boiling which grows bubbles for expelling ink by using thermal energy.

37. An ink jet recording apparatus as claimed in claim 27, wherein said recording heads comprise two or more recording heads for ejecting black ink.

38. An ink jet recording apparatus as claimed in claim 27, wherein said text region contains at least one of a part of a character and a thin line thinner than a predetermined thickness, and said halftone region contains a continuous halftone portion or a dot image portion.

39. An ink jet recording apparatus as claimed in claim 27, wherein each of said recording heads ejects ink of a predetermined color, at least one of said recording heads ejecting black ink, and said recording controlling means controls recording such that said text region is recorded by said recording head ejecting black ink.

40. An ink jet recording apparatus as claimed in claim 27, wherein each of said recording heads ejects ink of a predetermined color, at least one of said recording heads ejecting black ink, and said recording controlling means controls recording such that said text region and said halftone region are recorded by said plurality of recording heads, and said text region is recorded by said recording head ejecting black ink.

41. An ink jet recording apparatus as claimed in claim 27, wherein a first recording of said text region is performed while said recording heads are moving in a forward direction of the moving direction of said recording heads, and a second recording of said text region is performed while said recording heads are moving in a backward direction of the moving direction of said recording heads.

42. An ink jet recording apparatus for performing recording on a recording medium by depositing ink onto the recording medium in response to a recording data signal, said apparatus comprising:

a plurality of recording heads for ejecting inks, each of said recording heads electing ink of a predetermined color, at least one of said recording heads ejecting black ink;

moving means for relatively moving said recording heads and said recording medium;

image identifying means for identifying a recording data signal corresponding to a text region which includes at least one of a part of a character and a line thinner than a predetermined thickness, and for identifying a recording data signal corresponding to a halftone region including a dot image;

recording controlling means for controlling recording such that the text region is recorded by said recording head ejecting black ink; and recording medium identifying means for identifying a type of said recording medium, wherein said recording controlling means controls, when said recording medium identifying means identifies that the recording medium is a type of low ink absorption, said recording heads so that the recording data signal corresponding to the halftone region is recorded once, while the recording data signal corresponding to the text region is recorded twice on the same area.

43. An ink jet recording apparatus as claimed in claim 42, wherein said image identifying means comprises:

black signal generating means for generating a first black signal by suppressing chromatic components of said recording data signal;

black signal binarizing means, connected to an output of said black signal generating means, for binarizing said first black signal outputted from said black signal generating means; and black signal identifying means, connected to an output of said black signal generating means, for identifying said text regions, or said halftone regions on the basis of the binary first black signal.

44. An ink jet recording apparatus as claimed in claim 43, further comprising a black signal generating means comprising:

a maximum value detector for detecting a maximum value of R, G and B components of said recording data signal;

a minimum value detector for detecting a minimum value of the R, G and B components of said recording data signal;

a subtracter for subtracting said minimum value from said maximum value;

a multiplier for multiplying an output of said subtracter by a predetermined fixed value;

an adder for adding said maximum value and an output of said multiplier; and a limiter for limiting an output of said adder.

45. An ink jet recording apparatus as claimed in claim 43, wherein said black signal binarizing means comprises:

means for producing first black signals of a pixel of interest and its neighboring pixels;

averaging means for calculating an average value of said first black signals of said pixel of interest and its neighboring pixels;

first comparing means for comparing said average value with the black signal of said pixel of interest to produce a second black signal of said pixel of interest representing that said pixel of interest is black; and second comparing means for comparing a difference of said average value and the first black signal of said pixel of interest with a predetermined value to produce a differential signal representative of difference between a black level of said pixel of interest and an average value of black levels of its neighboring pixels.

46. An ink jet recording apparatus as claimed in claim 45, wherein said black signal identifying means comprises:

means for producing second black signals of a pixel of interest and its neighboring pixels by delaying said second black signal outputted from said first comparing means;

means for producing an isolation indicating signal of the pixel of interest by comparing the second black signal of the pixel of interest with the second black signals of its neighboring pixels;

means for producing a third black signal representing that the pixel of interest is black when said isolation indicating signal, said second black signal and said differential signal of said pixel of interest are all indicating black level, and means for producing fourth black signal representing that the pixel of interest is a part of text region based on said third black signals of the pixel of interest and of its neighboring pixels.

47. An ink jet recording apparatus as claimed in claim 46, further comprising recording data signal processing means for processing said recording data signal based on an identification result by said image identifying means.

48. An ink jet recording apparatus as claimed in claim 47, wherein said recording data signal processing means suppresses said color components of said recording data signal when said fourth black signal indicates that the pixel of interest is in a text region.

49. An ink jet recording apparatus as claimed in claim 48, wherein said recording controlling means controls said recording heads so that each color component of said recording data signal is directly recorded.

50. An ink jet recording apparatus as claimed in claim 42, further comprising subscanning means for effecting relative movement of said recording heads and said recording medium in a subscanning direction substantially perpendicular to the moving direction of said recording heads by said moving means, after completing a recording while moving said recording heads by said moving means, wherein said recording heads comprise four heads, each of which corresponds to each one of four colors of black, cyan, magenta and yellow, and is divided into a plurality of sections each including a plurality of orifices aligned along the subscanning direction, and said recording controlling means controls said recording heads so that selected sections sequentially eject ink.

51. An ink jet recording apparatus as claimed in claim 42, wherein each of said recording heads generates film boiling which grows bubbles for expelling ink by using thermal energy.

52. An ink jet recording apparatus as claimed in claim 42, wherein said recording heads include two or more recording heads for ejecting black ink.

53. An ink jet recording apparatus as claimed in claim 42, wherein said text region contains at least one of a part of a character and a thin line thinner than a predetermined thickness, and said halftone region contains a continuous halftone portion or a dot image portion.

54. An ink jet recording apparatus as claimed in claim 42, wherein said recording controlling means controls recording such that said text region and said halftone region are recorded by said plurality of recording heads.

55. An ink jet recording apparatus as claimed in claim 42, wherein a first recording of said text region is performed while said recording heads are moving in a forward direction of the moving direction of said recording heads, and a second recording of said text region is performed while said recording heads are moving in a backward direction of the moving direction of said recording heads.

56. An ink jet recording method for forming on a recording medium an image including a text region that contains at least one of a part of a character and a thin line thinner than a predetermined thickness, and a halftone region that contains a dot image by ejecting ink from recording heads in response to a recording data signal, said method comprising the steps of:

identifying the text region and the halftone region of said image on the basis of said recording data signal;

separating recording data associated with a plurality of colors in said halftone region into first recording data and second recording data, said first recording data and said second recording data being complementary to each other; and controlling recording so that recording of said text region is emphasized relative to recording of said halftone region, wherein said step of identifying the text region and the halftone region comprises the steps of:

generating a first black signal by suppressing chromatic components of said recording data signal;

binarizing said first black signal; and identifying said text regions or said halftone regions on the basis of the binarized first black signal, wherein said step of generating a first black signal comprises the steps of:

detecting a maximum value of R, G and B components of said recording data signal;

detecting a minimum value of the R, G and B components of said recording data signal;

subtracting said minimum value from said maximum value;

multiplying an output of said subtracting step by a predetermined fixed value;

adding said maximum value and an output of said multiplying step; and limiting an output of said adding step.

57. An ink jet recording method as claimed in claim 56, wherein said step of binarizing said first black signal comprises:

producing first black signals of a pixel of interest and its neighboring pixels;

calculating an average value of said first black signals of said pixel of interest and its neighboring pixels;

comparing, in a first comparing step, said average value with the black signal of said pixel of interest to produce a second black signal of said pixel of interest representing that said pixel of interest is black; and comparing, in a second comparing step, a difference of said average value and the first black signal of said pixel of interest with a predetermined value to produce a differential signal representative of a difference between a black level of said pixel of interest and an average value of black levels of its neighboring pixels.

58. An ink jet recording method as claimed in claim 57, wherein said step of identifying said text region or said halftone region further comprises:

producing second black signals of a pixel of interest and of its neighboring pixels by delaying said second black signal outputted in said first comparing step;

producing an isolation indicating signal of the pixel of interest by comparing the second black signal of the pixel of interest with the second black signals of its neighboring pixels;

producing a third black signal representing that the pixel of interest is black when said isolation indicating signal, said second black signal and said differential signal of said pixel of interest are all indicating black level; and producing a fourth black signal representing that the pixel of interest is a part of text region based on said third black signals of the pixel of interest and of its neighboring pixels.

59. An ink jet recording method as claimed in claim 56, wherein said first recording data is associated with a staggered pattern of said halftone region, and said second recording data is associated with a counter-staggered pattern of said halftone region, said counter-staggered pattern being a complement of said staggered pattern.

60. An ink jet recording method as claimed in claim 56, wherein said step of separating recording data performs the separation for each color of a plurality of colors in said halftone region.

61. An ink jet recording method as claimed in claim 56, wherein the text region contains at least one of a part of a character and a thin line thinner than a predetermined thickness, and the halftone region contains a continuous halftone portion or a dot image portion.

62. An ink jet recording method as claimed in claim 56, wherein each of the recording heads ejects ink of a predetermined color, at least one of the recording heads ejecting black ink, and further comprising the step of controlling recording such that the text region is recorded by the recording head ejecting black ink.

63. An ink jet recording method as claimed in claim 56, wherein each of the recording heads ejects ink of a predetermined color, at least one of the recording heads ejecting black ink, and further comprising the step of controlling recording such that the text region and the halftone region are recorded by the plurality of recording heads, and the text region is recorded by the recording head ejecting black ink.

64. An ink jet recording method as claimed in claim 56, wherein one of first and second recording steps is performed while the recording heads are moving in a forward direction of the moving direction of the recording heads, and the other one of the first and second recording steps is performed while the recording heads are moving in a backward direction of the moving direction of the recording heads.

65. An ink jet recording system, including an ink jet recording section having ink jet recording heads for ejecting inks, for performing recording on a recording medium by ejecting inks from the ink jet recording heads onto the recording medium, the ink jet recording system comprising:

image identifying means for identifying a text region, including at least one of a character and a line, and a halftone region, of an image to be recorded in accordance with a recording data signal;

determining means for determining a number of times of performing recording operations for each region of the image to be recorded in accordance with a type of region identified by said image identifying means; and recording controlling means for controlling said ink jet recording section to perform recording on the recording medium in accordance with the recording data signal and the number of times of performing recording operations for each region determined by said determining means.

66. An ink jet recording system as claimed in claim 65, wherein said image identifying means comprises:

black signal generating means for generating a first black signal by suppressing color components of said recording data signal;

black signal binarizing means, connected to an output of said black signal generating means, for binarizing said first black signal outputted from said black signal generating means; and black image identifying means, connected to an output of said black signal generating means, for identifying said text regions, or said halftone regions, on the basis of the binary first black signal.

67. An ink jet recording system as claimed in claim 66, wherein said black signal generating means comprises:

a maximum value detector for detecting a maximum value of R, G and B components of said recording data signal;

a minimum value detector for detecting a minimum value of the R, G and B components of said recording data signal;

a subtracter for subtracting said minimum value from said maximum value;

a multiplier for multiplying an output of said subtracter by a predetermined fixed value;

an adder for adding said maximum value and an output of said multiplier; and a limiter for limiting an output of said adder.

68. An ink jet recording system as claimed in claim 66, wherein said black signal binarizing means comprises:

means for producing first black signals of a pixel of interest and its neighboring pixels;

averaging means for calculating an average value of said first black signals of said pixel of interest and its neighboring pixels;

first comparing means for comparing said average value with the black signal of said pixel of interest to produce a second black signal of said pixel of interest representing that said pixel of interest is black; and second comparing means for comparing a difference of said average value and the first black signal of said pixel of interest with a predetermined value to produce a differential signal representative of a difference between a black level of said pixel of interest and an average value of black levels of its neighboring pixels.

69. An ink jet recording system as claimed in claim 68, wherein said black image identifying means comprises:

means for producing second black signals of a pixel of interest and of its neighboring pixels by delaying said second black signal outputted from said first comparing means;

means for producing an isolation indicating signal of the pixel of interest by comparing the second black signal of the pixel of interest with the second black signals of its neighboring pixels;

means for producing a third black signal representing that the pixel of interest is black when said isolation indicating signal, said second black signal and said differential signal of said pixel of interest are all indicating black level; and means for producing a fourth black signal representing that the pixel of interest is a part of the text region based on said third black signals of the pixel of interest and of its neighboring pixels.

70. An ink jet recording system as claimed in claim 69, further comprising recording data signal processing means for processing said recording data signal based on an identification result by said image identifying means.

71. An ink jet recording system as claimed in claim 70, wherein said recording data signal processing means suppresses said color components of said recording data signal when said fourth black signal indicates that the pixel of interest is in a text region.

72. An ink jet recording system as claimed in claim 71, wherein said recording controlling means controls said recording heads so that each color component of said recording data signal is directly recorded.

73. An ink jet recording system claimed in claim 65, further comprising subscanning means for effecting relative movement of said recording heads and said recording medium in a subscanning direction substantially perpendicular to a moving direction of said recording heads by a moving means, after completing a recording operation while moving said recording heads by said moving means, wherein said recording heads comprise four heads, each of which corresponds to each one of four colors of black, cyan, magenta and yellow, and is divided into a plurality of sections each including a plurality of orifices aligned along the subscanning direction, and said recording controlling means controls said recording heads so that selected sections sequentially eject ink.

74. An ink jet recording system as claimed in claim 73, wherein a first recording operation of said text region is performed while said recording heads are moving in a forward direction of the moving direction of said recording heads, and a second recording operation of said text region is performed while said recording heads are moving in a backward direction of the moving direction of said recording heads.

75. An ink jet recording system as claimed in claim 65, wherein each of said recording heads generates film boiling which grows bubbles for expelling ink by using thermal energy.

76. An ink jet recording system as claimed in claim 65, wherein said recording heads include two or more heads for ejecting black ink.

77. An ink jet recording system as claimed in claim 65, wherein said text region contains at least one of a part of a character and a thin line thinner than a predetermined thickness, and said halftone region contains a continuous halftone portion or a dot image portion.

78. An ink jet recording system as claimed in claim 65, wherein each of said recording heads ejects ink of a predetermined color, at least one of said recording heads ejecting black ink, and said recording controlling means controls the recording operations such that said text region is recorded by said recording head ejecting black ink.

79. An ink jet recording system as claimed in claim 65, wherein each of said recording heads ejects ink of a predetermined color, at least one of said recording heads ejecting black ink, and said recording controlling means controls the recording operations such that said text region and said halftone region are recorded by all of said recording heads, and said text region is recorded by said recording head ejecting black ink.

80. The ink jet recording system as claimed in claim 65, wherein the number of times of performing recording operations for a text region is different from a number of times of performing recording operations for a halftone region.

81. An ink jet recording method for performing recording on a recording medium in response to a recording data signal by ejecting ink onto the recording medium from an ink jet recording section having ink jet recording heads for ejecting inks, said ink jet recording method comprising the steps of:

identifying a text region including at least one of a character and a line, and a halftone region of an image to be recorded in accordance with the recording data signal corresponding to said image;

determining a number of times of performing recording operations for each region of said image to be recorded, in accordance with a type of region identified in said identification step, and generating a recording number signal corresponding to the determined number of times of recording operations;

transferring the recording data signal and the recording number signal for each region of said image to the ink jet recording section; and controlling the ink jet recording section to perform a recording operation on the recording medium, in accordance with the transferred recording data signal and the recording number signal.

82. An ink jet recording method as claimed in claim 81, wherein said step of identifying the text region and the halftone region comprises the steps of:

generating a first black signal by suppressing chromatic components of said recording data signal;

binarizing said first black signal; and identifying said text region or said halftone region on the basis of the binarized first black signal.

83. An ink jet recording method as claimed in claim 82, wherein said step of generating a first black signal comprises the steps of:

detecting a maximum value of R, G and B components of said recording data signal;

detecting a minimum value of the R, G and B components of said recording data signal;

subtracting said minimum value from said maximum value;

multiplying an output of said subtracting step by a predetermined fixed value;

adding said maximum value and an output of said multiplying step; and limiting an output of said adding step.

84. An ink jet recording method as claimed in claim 82, wherein said step of binarizing said first black signal comprises:

producing first black signals of a pixel of interest and its neighboring pixels;

calculating an average value of said first black signals of said pixel of interest and its neighboring pixels;

comparing, in a first comparing step, said average value with the black signal of said pixel of interest to produce a second black signal of said pixel of interest representing that said pixel of interest is black; and comparing, in a second comparing step, a difference of said average value and the first black signal of said pixel of interest with a predetermined value to produce a differential signal representative of a difference between a black level of said pixel of interest and an average value of black levels of its neighboring pixels.

85. An ink jet recording method as claimed in claim 84, wherein said step of identifying said text region and said halftone region further comprises:

producing second black signals of a pixel of interest and of its neighboring pixels by delaying said second black signal outputted in said first comparing step;

producing an isolation indicating signal of the pixel of interest by comparing the second black signal of the pixel of interest with the second black signals of its neighboring pixels;

producing a third black signal representing that the pixel of interest is black when said isolation indicating signal, said second black signal and said differential signal of said pixel of interest are all indicating black level; and producing a fourth black signal representing that the pixel of interest is a part of a text region based on said third black signals of the pixel of interest and of its neighboring pixels.

86. An ink jet recording method as claimed in claim 81, further comprising the step of separating recording data associated with a plurality of colors in the halftone region into first recording data and second recording data, said first recording data and said second recording data being complementary to each other, wherein said first recording data is associated with a staggered pattern of said halftone region, and said second recording data is associated with a counter-staggered pattern of said halftone region, said counter-staggered pattern being a complement of said staggered pattern.

87. An ink jet recording method as claimed in claim 86, wherein said step of separating recording data performs the separation for each color of a plurality of colors in said halftone region.

88. An ink jet recording method as claimed in claim 81, wherein the text region contains at least one of a part of a character and a thin line thinner than a predetermined thickness, and the halftone region contains a continuous halftone portion or a dot image portion.

89. An ink jet recording method as claimed in claim 81, wherein each of said recording heads ejects ink of a predetermined color, at least one of said recording heads ejecting black ink, and further comprising the step of controlling a recording operation such that the text region is recorded by the recording head ejecting black ink.

90. An ink jet recording method as claimed in claim 81, wherein each of the recording heads ejects ink of a predetermined color, at least one of the recording heads ejecting black ink, and further comprising the step of controlling a recording operation such that the text region and the halftone region are recorded by all of the recording heads, and the text region is recorded by the recording head ejecting black ink.

91. An ink jet recording method as claimed in claim 81, wherein in said determining step, a number of times of performing recording operations for the text region is different from a number of times of performing recording operations for the halftone region.

92. An ink jet recording system, including an ink jet recording section having ink jet recording heads for ejecting inks, for performing recording on a recording medium by ejecting inks from the ink jet recording heads onto the recording medium, said ink jet recording system comprising:

image identifying means for identifying a black portion and a color portion of data of an image to be recorded;

determining means for determining a recording control operation for the data of the image to be recorded based upon an identification result from said image identifying means; and a recording controlling section for controlling the ink jet recording section to perform recording in accordance with the data of the image to be recorded and the recording control operation determined by said determining means.

93. An ink jet recording system as claimed in claim 92, wherein said controlling section controls the ink jet recording section to perform scanning during recording, and wherein said determining means determines a number of times of performing scanning to record an image in accordance with the identification result of said image identifying means, and wherein a number of times of performing scanning to record the black portion is different from a number of times of performing scanning to record the color portion.

94. An ink jet recording system as claimed in claim 92, further comprising subscanning means for effecting relative movement of the recording heads and the recording medium in a subscanning direction substantially perpendicular to a scanning direction of the recording heads by a moving means, after completing a recording while moving the recording heads by the moving means, wherein the recording heads comprise four heads, each of which corresponds to each one of four colors of black, cyan, magenta and yellow, and is divided into a plurality of sections each including a plurality of orifices aligned along the subscanning direction, and said recording controlling section controls the recording heads so that selected sections sequentially eject ink.

95. An ink jet recording system as claimed in claim 94, wherein during recording a first scanning of the black portion is performed while the recording heads are moving in a forward direction of the scanning direction of the recording heads, and a second scanning of the black portion is performed while the recording heads are moving in a backward direction of the scanning direction of the recording heads.

96. An ink jet recording system as claimed in claim 92, wherein each of the recording heads generates film boiling which grows bubbles for expelling ink by using thermal energy.

97. An ink jet recording system as claimed in claim 92, wherein the recording heads include two or more recording heads for ejecting black ink.

98. An ink jet recording method for performing recording on a recording medium by ejecting inks from an ink jet recording section having ink jet recording heads for ejecting inks, said method comprising the steps of:

- identifying a black portion and a color portion of data of an image to be recorded;
- determining a recording control operation for the data of the image to be recorded based upon an identification result from said image identifying step, and generating corresponding recording control data;
- transferring the data of the image to be recorded and the recording control data to the ink jet recording section; and
- controlling the ink jet recording section to perform recording in accordance with the transferred data of the image to be recorded and the recording control data.

99. An ink jet recording method as claimed in claim 98, wherein, in said determining step, a number of times of performing scanning during recording of an image to be recorded is determined, and wherein a number of times of performing scanning for the black portion is different from a number of times of performing scanning for the color portion.

100. An ink jet recording method as claimed in claim 98, wherein each of the recording heads generates film boiling which grows bubbles for expelling ink by using thermal energy.

101. An ink jet recording method as claimed in claim 98, further comprising the step of relatively moving the recording heads and the recording medium in a subscanning direction substantially perpendicular to a scanning direction of the recording heads by a moving means, after completing a recording while moving the recording heads by the moving means, wherein the recording heads comprise four heads, each of which corresponds to each one of four colors of black, cyan, magenta and yellow, and is divided into a plurality of sections each including a plurality of orifices aligned along the subscanning direction, and the recording heads are controlled so that selected sections sequentially eject ink, and wherein, during controlling of the ink jet recording section to perform recording, a first scanning of the black portion is performed while the recording heads are moving in a forward direction of the scanning direction of the recording heads, and a second scanning of the black portion is performed while the recording heads are moving in a backward direction of the scanning direction of the recording heads.

102. An ink jet recording method as claimed in claim 98, wherein the black portion contains at least one of a part of a character and a thin line thinner than a predetermined thickness, and the color portion contains a continuous halftone portion or a dot image portion.

103. An ink jet recording method as claimed in claim 98, wherein each of the recording heads ejects ink of a predetermined color, at least one of the recording heads ejects black ink, and further comprising the step of controlling recording such that the black portion is scanned by the recording head ejecting black ink.

104. An ink jet recording method as claimed in claim 98, wherein each of the recording heads ejects ink of a predetermined color, at least one of the recording heads ejects black ink, and further comprising the step of controlling recording such that the black portion and the color portion are scanned by a plurality of recording heads, and the black portion is scanned by the recording head ejecting black ink.

105. An ink jet recording method as claimed in claim 98, wherein recording is performed during at least a first scanning step and a second scanning step such that one of the first scanning step and the second scanning step is performed while the recording heads are moving in a forward direction of a scanning direction of the recording heads, and the other of the first scanning step and the second scanning step is performed while the recording heads are moving in a backward direction of the scanning direction of the recording heads.

* * * * *

UNITED STATES PATENT AND TRADEMARK OFFICE
CERTIFICATE OF CORRECTION

PATENT NO. : 5,745,145

DATED : April 28, 1998

INVENTOR(S) : HIROMITSU HIRABAYASHI, ET AL.

It is certified that error appears in the above-identified patent and that said Letters Patent is hereby corrected as shown below:

COLUMN 5

Line 25, "Invention;" should read --invention;--.

COLUMN 26

Line 28, "electing" should read --ejecting--.

COLUMN 30

Line 6, "of" should read --of the--.

COLUMN 31

Line 42, "system" should read --system as--.

Signed and Sealed this

Eleventh Day of May, 1999

Attest:

Q. TODD DICKINSON

*Attesting Officer*      *Acting Commissioner of Patents and Trademarks*